(12) United States Patent
Sundaresan et al.

(10) Patent No.: US 8,767,580 B2
(45) Date of Patent: Jul. 1, 2014

(54) FEMTOCELL RESOURCE MANAGEMENT FOR INTERFERENCE MITIGATION

(75) Inventors: Karthikeyan Sundaresan, Howell, NJ (US); Mustafa Arslan, Riverside, CA (US); Jongwon Yoon, Seoul (KR)

(73) Assignee: NEC Laboratories America, Inc., Princeton, NJ (US)

( * ) Notice: Subject to any disclaimer, the term of this patent is extended or adjusted under 35 U.S.C. 154(b) by 220 days.

(21) Appl. No.: 13/408,487

(22) Filed: Feb. 29, 2012

(65) Prior Publication Data

US 2012/0230267 A1 Sep. 13, 2012

Related U.S. Application Data

(60) Provisional application No. 61/450,358, filed on Mar. 8, 2011, provisional application No. 61/485,195, filed on May 12, 2011.

(51) Int. Cl.
*H04J 1/08* (2006.01)
*G08C 15/00* (2006.01)
*H04W 4/00* (2009.01)
*H04W 40/00* (2009.01)
*H04W 72/00* (2009.01)
*H04B 7/00* (2006.01)
*H04W 72/06* (2009.01)
*H04W 28/04* (2009.01)
*H04W 28/06* (2009.01)
*H04W 84/04* (2009.01)
*H04W 24/10* (2009.01)

(52) U.S. Cl.
CPC .............. *H04W 72/06* (2013.01); *H04W 28/04* (2013.01); *H04W 72/00* (2013.01); *H04W 28/06* (2013.01); *H04W 28/044* (2013.01); *H04W 84/045* (2013.01); *H04W 24/10* (2013.01); *H04W 28/048* (2013.01)
USPC ........ 370/252; 370/329; 455/422.1; 455/446; 455/450; 455/452.2; 455/509

(58) Field of Classification Search
CPC ..... H04W 72/06; H04W 24/10; H04W 28/04; H04W 24/00
USPC ............ 370/329, 331, 252; 455/452.1, 452.2, 455/422.1, 446, 450, 409
See application file for complete search history.

(56) References Cited

U.S. PATENT DOCUMENTS 7,720,830 B2 * 5/2010 Wen et al. ..................... 707/705
8,340,038 B2 * 12/2012 Guvenc ......................... 370/329

(Continued)

OTHER PUBLICATIONS

Mishra, A., et al. "A Client-Driven Approach for Channel Management in Wireless LANS" 25th IEEE International Conference on Computer Communications Proceedings. INFOCOM 2006. Apr. 2006. pp. 1-13.

(Continued)

*Primary Examiner* — Alpus H Hsu
*Assistant Examiner* — Anthony Luo
(74) *Attorney, Agent, or Firm* — Akitaka Kimura; Joseph Kolodka

(57) ABSTRACT

Methods and systems for managing resources in femtocells are disclosed. One method includes transmitting at least one frame including a first zone of resources on which a set of base stations including at least one femtocell base station and base stations that are adjacent to the femtocell base station implement transmission of signals to impose interference. The one or more frames further includes a second zone dedicated for measuring throughput of mobile stations served by the femtocell base station without interference. The mobile stations are categorized by determining throughputs of the mobile stations with interference based on the transmission of signals on the first zone. Resources of at least one additional frame are configured based on the categorization. Further, the additional frame(s) are transmitted in a cell of the femtocell base station in accordance with the configuration.

15 Claims, 11 Drawing Sheets

(56) References Cited

U.S. PATENT DOCUMENTS

| | | | |
|---|---|---|---|
| 8,576,786 B2* | 11/2013 | Liao et al. | 370/329 |
| 8,583,135 B2* | 11/2013 | Hiltunen et al. | 455/452.2 |
| 2002/0114284 A1* | 8/2002 | Kronestedt et al. | 370/252 |
| 2003/0063583 A1* | 4/2003 | Padovani et al. | 370/329 |
| 2010/0189075 A1* | 7/2010 | Iwamura et al. | 370/331 |
| 2010/0260137 A1* | 10/2010 | Vrzic et al. | 370/330 |
| 2010/0322287 A1* | 12/2010 | Truong et al. | 375/133 |

OTHER PUBLICATIONS

Mishra, A., et al. "Weighted Coloring Based Channel Assignment for WLANS" ACM Sigmobile Mobile Computing and Communications Review, vol. 9, No. 3. Jul. 2005. (12 Pages).

Moscibroda, T., et al. "Load-Aware Spectrum Distribution in Wireless LANS" Proceedings of the 16th annual IEEE International Conference on Network Protocols. Oct. 2008. (10 Pages).

* cited by examiner

FEMTOCELL RESOURCE MANAGEMENT FOR INTERFERENCE MITIGATION

RELATED APPLICATION INFORMATION

This application claims priority to provisional application Ser. No. 61/450,358 filed on Mar. 8, 2011 and to provisional application Ser. No. 61/485,195 filed on May 12, 2011, both of which are incorporated herein by reference.

BACKGROUND

1. Technical Field

The present invention relates to resource management for wireless communication systems and more particularly to resource management and interference mitigation in femtocells.

2. Description of the Related Art

The demand for higher data rates and increased spectral efficiencies is driving next generation broadband access networks towards deploying smaller cell structures, in particular, femtocells, that use Orthogonal Frequency Division Multiple Access (OFDMA) schemes. Femtocells are installed indoors, for example in enterprises and homes, and operate using the same spectrum and access technology as traditional macro-cell towers, while connecting to the core network through a cable or DSL backhaul. In addition to the increased user throughput from short ranges, the smaller size of femtocells increases the system capacity due to increased spatial reuse. This permits mobile broadband service providers to (i) improve coverage and service quality, (ii) effectively balance load by offloading traffic from macrocells to femtocells, and (iii) reduce operational expenses and subscriber churn.

SUMMARY

One embodiment is directed to a method for managing resources in at least one femtocell. The method includes transmitting at least one frame including a first zone of resources on which a set of base stations including at least one femtocell base station and base stations that are adjacent to the femtocell base station implement transmission of signals to impose interference. The one or more frames further includes a second zone dedicated for measuring throughput of mobile stations served by the femtocell base station without interference. The mobile stations are categorized by determining throughputs of the mobile stations with interference based on the transmission of signals on the first zone. Resources of at least one additional frame are configured based on the categorization. Further, the additional frame(s) are transmitted in a cell of the femtocell base station in accordance with the configuration.

An alternative embodiment is directed to a system for managing transmission resources in at least one femtocell. The system includes a set of femtocell base stations and a central controller. The set of femtocell base stations are configured to transmit frames that include a first zone of resources on which the base stations implement transmission of signals to impose interference and include a second zone dedicated for measuring throughput of mobile stations served by at least one of the femtocell base stations without interference. The femtocell base station is further configured to perform categorization of the mobile stations in interference classes by determining throughputs of the mobile stations with interference based on the transmission of signals on the first zone. In addition, the central controller is configured to determine a configuration of resources of at least one additional frame based on the categorization. Further, the femtocell base station is further configured to transmit the additional frame(s) in accordance with the configuration.

Another embodiment is also directed to a method for managing resources in at least one femtocell. The method includes categorizing mobile stations served by the one or more femtocell base stations as a first class of mobile stations or a second class of mobile stations based on interference indications determined for the mobile stations. For mobile stations of the first class, the method further includes implementing first data transmissions to the mobile stations of the first class by associating non-contiguous first sub-carriers along a frequency spectrum into respective sub-channels for allocation to the mobile stations of the first class. In addition, for mobile stations of the second class, the method further includes implementing second data transmissions to the mobile stations of the second class by associating second sub-carriers along the frequency spectrum into respective sub-channels for allocation to said mobile stations of the second class. Here, the associating of the second sub-carriers is relatively more contiguous than the associating of the first sub-carriers.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
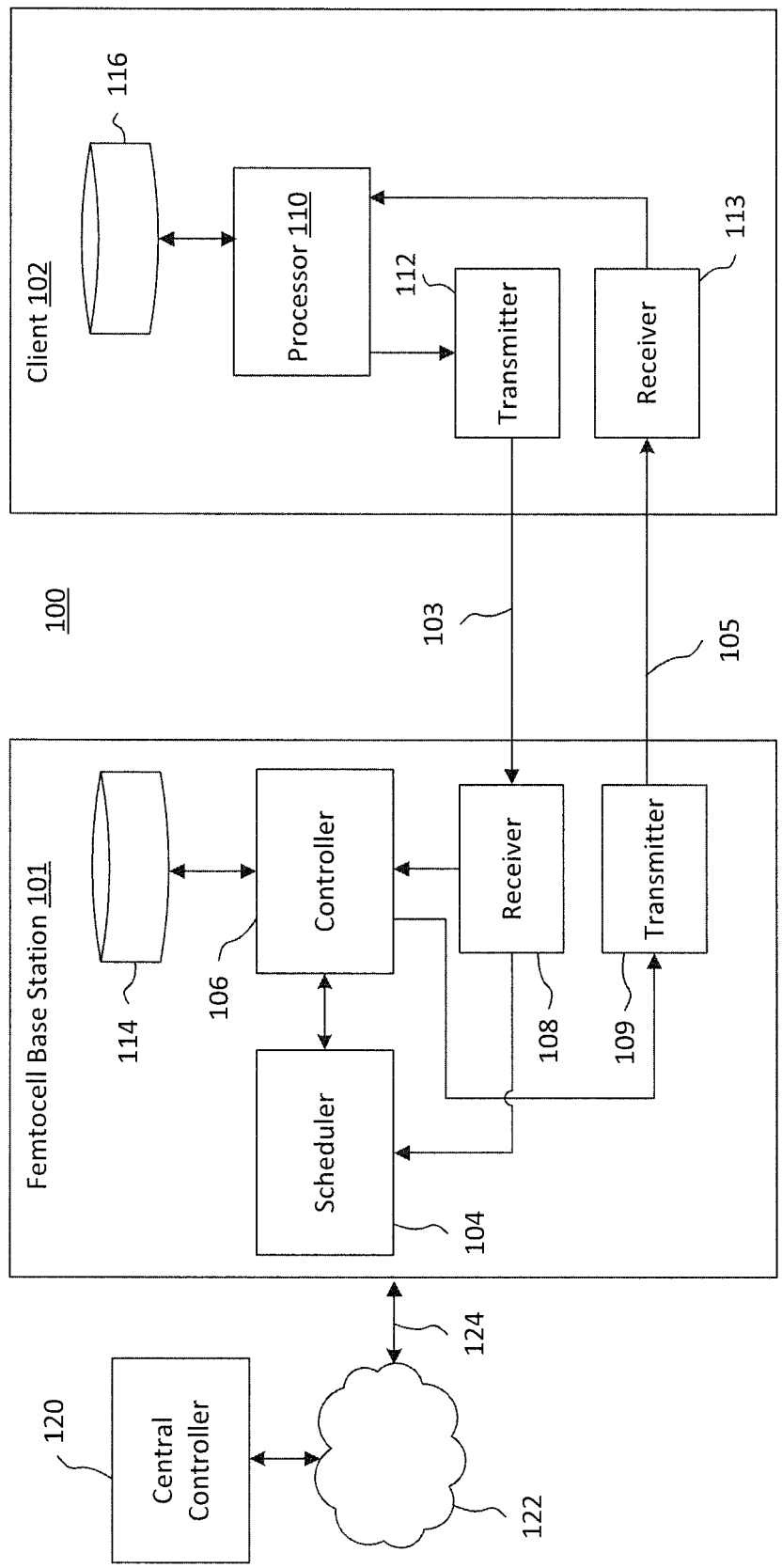
FIG. 1 is a block diagram of a system for managing transmission resources in femtocells in accordance with an exemplary embodiment.

To obtain the benefits of femtocells described above, the femtocells interoperate with and use the same access technology as macrocells. Hence, resource management solutions for femtocells cannot be efficiently designed independently from and without consideration of macrocell designs. In particular, interference mitigation between femtocells should be addressed in view of these considerations. There are several key aspects that make the resource management problem both challenging and unique in OFDMA femtocells.

For example, typical femtocell deployments are significantly more dense as compared to the well-planned deployments of macrocells. Hence, while interference is localized at cell edges in macrocells, it is less predictable and more pervasive across femtocells. This renders Fractional Frequency Reuse (FFR) solutions (proposed for macrocells) inadequate for mitigating interference between femtocells.

Furthermore, femtocell resource management presents different challenges than that of WiFi networks. In femtocell networks, OFDMA uses a synchronous medium access on a licensed spectrum. In contrast, WiFi stations access the spectrum in an asynchronous manner. This affects resource management and interference mitigation in the two systems in a fundamental way. In a typical WiFi system, interfering cells are either tuned to operate on orthogonal channels or use carrier sensing to arbitrate medium access on the same channel. However, in an OFDMA femtocell system, there is no carrier sensing. Interfering cells can either operate on orthogonal parts (referred to as sub-channels) of the spectrum, or directly project interference on the clients of each other. Further, in OFDMA, transmissions to different clients of a single cell are multiplexed in each frame. Since every client of a cell may not need spectral isolation for purposes of interference mitigation, blindly operating adjacent cells on orthogonal parts of the spectrum induces the cost of underutilization of the available capacity. In other words, resource isolation in OFDMA femtocells should be administrated with care. In a WiFi system, since an access point transmits data to a single client at a time (using the entire channel assigned to it), this challenge does not arise.

Exemplary embodiments described herein are directed to OFDMA-based femtocell networks and can be applied to OFDMA wireless broadband technologies, including Worldwide Interoperability for Microwave Access (WiMAX) and Third Generation Partnership Project Long Term Evolution (LTE) systems. However, it should be noted that the embodiments described herein can be employed with other coding schemes.

Embodiments of the present principles can decouple resource management across the network from scheduling within each femtocell and addresses the former. This permits resource allocation across femtocells to be determined by a central controller (CC) at coarse time scales. Frame scheduling within each femtocell can then be executed independently on the allocated set of resources. In accordance with aspects of the present principles, embodiments can include several features to implement resource management.

For example, embodiments can incorporate frequency domain isolation. Here, resources for clients in each femtocell can be isolated in the frequency domain, as opposed to the time domain. This permits for power pooling to jointly mitigate interference and increase system capacity, as discussed in more detail herein below. In accordance with another exemplary aspect, embodiments can implement client categorization. For example, as part of the broader resource management features, embodiments can identify the spectral needs of clients of femtocells by categorizing clients accordingly and thereby enable resource reuse and resource isolation for each femtocell depending on client categories. Embodiments can employ proactive, measurement-driven triggers to intelligently distinguish, with an accuracy of over 90%, clients that need just link adaptation from those that need resource isolation.

For example, clients can be categorized into two classes using measurements: Class 1 clients and Class 2 clients. Class 1 clients are clients that have throughput benefits from reusing the spectrum as opposed to having an isolated set of resources. Class 2 clients are clients that have throughput benefits from interference mitigation via isolation of resources from interfering femtocells. In addition, resources are allocated to femtocells based on the categories of their clients and the traffic load for each client category.

Embodiments can also include zoning aspects. For example, embodiments can incorporate a frame structure that supports the graceful coexistence of clients that can reuse the spectrum and the clients that need resource isolation. For example, a resource reuse zone can be determined for each femtocell to enable the benefits from resource reuse for Class 1 clients.

Moreover, embodiments can implement resource allocation and assignment by utilizing novel algorithms to assign orthogonal sub-channels to interfering femtocells in a near-optimal fashion. For example, the resource allocation can attempt to achieve a weighted (load-based) max-min fair allocation of sub-channels to femtocells to remove interference on Class 2 clients.

Systems described herein can provide a complete resource management solution in a way that is standards compatible; this permits its adoption on not only experimental platforms but also on commercial femtocell systems. Comprehensive evaluations show that the resource management techniques described herein yield significant gains in system throughput over conventional approaches.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an exemplary femtocell system 100 is illustratively depicted. The system 100 can include a transmitter 101 that services and transmits data signals to a receiver 102. The transmitter 101 is one exemplary implementation of a femtocell base station. Similarly, the receiver 102 is one exemplary implementation of a client or user equipment served by the femtocell base station 101. The transmitter 101 can include a controller 106, a storage medium 114, a scheduler 104, a receiver 108 and a transmitter 109. The controller 106 can control the operations of the other elements of the transmitter 101. Here, the controller can utilize the storage medium 114 to store a program of instructions that implement one or more aspects of the methods described herein. The receiver 108 can be configured to receive uplink transmission signals along the uplink 103, while the transmitter 109 can be configured to transmit downlink signals along the downlink 105. Further, the controller 106 can employ a scheduler 104 to schedule and allocate resource blocks (e.g., subcarriers) to the users/receivers that the transmitter 101 services. In turn, the receiver 102 can include a processor 110, a storage medium 116, a receiver 113 and a transmitter 112. The processor 110 can control the operations of the other elements of the receiver 102. In addition, the processor 110 can utilize the storage medium 116 to store a program of instructions that implement one or more aspects of the methods described herein. The transmitter 112 can be configured to transmit uplink transmission signals along the uplink 103, while the receiver 113 can be configured to receive downlink signals along the downlink 105. Each of the transmitter 109, transmitter 112, receiver 103 and receiver 113 includes antenna and other related processing circuitry. The system 100 can further include a central controller 120 that can be implemented by a hardware processor on a server on a network 122. The base station 201 can communicate with the central controller 120 through a cable or backhaul 124 that is coupled to the network 122. Furthermore, although not shown in the drawing for purposes of brevity, the system 100 can include a plurality of base stations 101 and corresponding mobile stations 102 that the base stations service. In addition, the coverage area of each of the base stations 101 may or may not overlap with other base stations 101. Each of the base stations can employ their own corresponding cable or backhaul 124 to the network 122 to communicate with the CC 120. The functions of various elements of the transmitter 101, the receiver 102 and the CC 120 are described in more detail herein below with respect to method embodiments.

Prior to describing method embodiments in detail, a brief description of WiMAX macrocell and femtocell systems and related work is provided to aid in understanding aspects of the present principles. With regard to macrocellular systems, although broadband standards employing OFDMA (WiMAX, LTE) are relatively recent, related research has existed for some time. There are studies that address problems pertaining to single cell and multi-cell OFDMA systems. Several efforts have examined the interference between macrocells and femtocells, leveraging the localized interference coupled with planned cell layouts of macrocells. However, the interference between femtocells has not been adequately addressed, as femtocells lack the desired features of localized interference and planned deployments. There have been some recent studies that address interference among femtocells via distributed mechanisms. However, they are restricted to theoretical studies with simplifying assumptions that prevent their adoption in practice. In contrast, the centralized resource management system and method described herein has been implemented to mitigate interference among femtocells. The system has been tested on real OFDMA hardware and maintains standards compatibility for easy deployment on commercial femtocell systems.

In addition to the studies in the cellular domain, there have been studies addressing resource allocation using graph coloring for WiFi systems. WiFi is an asynchronous access technology that operates on an unlicensed spectrum with multiple orthogonal channels of contiguous bandwidth. The main objective in these studies is to allocate a minimum number of orthogonal contiguous channels to each interfering access point (AP). In addition, WiFi does not multiplex transmissions to multiple clients in the same downlink frame.

In contrast to WiFi, OFDMA is a synchronous access technology operating on a licensed spectrum. In accordance with OFDMA, a given spectrum is allocated to femtocells with a granularity of sub-channels, permitting more flexible bandwidth allocation. This property of OFDMA renders previous approaches inadequate in addressing flexible (i.e. non-contiguous) bandwidth allocation to OFDMA femtocells. One aspect of the present principles includes realizing a weighted max-min fair allocation while utilizing as many sub-channels (fragments of the spectrum) as possible. In addition, resource allocation is just one component of embodiments described herein. Embodiments can also implement a novel, complete resource management system with several enhancements specifically tailored to OFDMA.

There have also been approaches that allocate spectrum fragments to contending stations. However, these studies rely on asynchronous random access and associated sensing capabilities. The present principles address a more challenging problem in OFDMA synchronous access systems and satisfy specifications that are unique to OFDMA femtocells.

It should be understood that, while aspects of the present principles can apply to multi-cell OFDMA femto networks in general, the embodiments are described herein with respect to WiMAX femtocell systems for expository purposes. In WiMAX, the spectrum is divided into multiple tones (sub-carriers) and several sub-carriers are grouped to form a sub-channel. Specifically, distributed grouping (PUSC), described in more detail herein below, is a preferred grouping mode, as it is mandatorily supported. Interference from the same source could be different on different sub-channels if frequency selectivity is taken into account. However in PUSC, the subcarriers composing a sub-channel are picked randomly from the spectrum subject to specific permutations.

This, in turn, averages the effect of frequency selectivity and interference on a given sub-channel, thereby giving a uniform effect across sub-channels. A WiMAX frame is a two-dimensional template that carries data to multiple mobile stations (MSs) across both time (symbols) and frequency (sub-channels) domains. The combination of a symbol and a sub-channel constitutes a tile, the basic unit of resource allocation at the media access control (MAC) sub-layer of the data link layer in the Open Systems Interconnection (OSI) model. Data to users are allocated as rectangular bursts of tiles in a frame.

Figure 2:
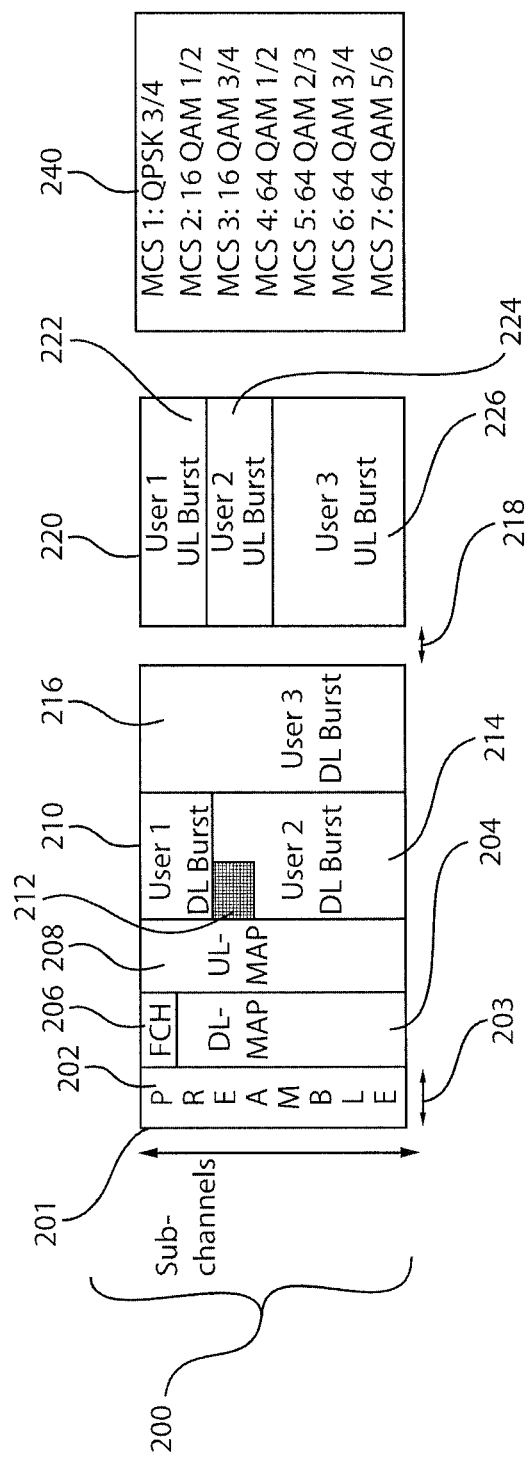
FIG. 2 is a block diagram of a WiMAX frame structure.

In OFDMA femtocells, frame transmissions are synchronized in time both between the base station (BS) and MSs as well as across BSs by virtue of synchronizing to the macro BS. An example of a WiMAX time division duplexing (TDD) frame is shown in FIG. 2. The transmissions from the BS to a mobile station (MS), on a downlink frame portion 201, and transmissions from the MS to the BS, on an uplink frame portion 220, are separated in time by a transition gap 218. The frame consists of the preamble 202, which indicates the symbol duration 203, and the control and data payload. The control portion comprises a frame control header (FCH) 206, a downlink (DL) map 204 and an uplink (UL) map 208. In addition, the DL data payload includes a DL burst 210 for a first MS, a DL burst 214 for a second MS and a DL burst 216 for a third MS. In turn, the UL data payload includes a UL burst 222 from the first MS, a UL burst 224 from the second MS and a UL burst 226 from the third MS. The data payloads are comprised of tiles 212. The modulation and coding schemes (MCSs) available for coding and decoding of the data payload portions are illustrated in block 240. Each MS may be assigned a modulation and coding scheme (MCS) by the BS and different MCSs can be assigned to different MSs.

While the preamble 201 is used by the MS to lock on to a particular BS, the control consists of FCH 206 and MAPs 204 and 208. A MAP conveys the location of the data burst for an MS in a frame and consists of both the downlink and uplink MAPs 204 ad 208, respectively. A BS schedules the use of tiles both on the downlink and the uplink. The DL-MAP 204 indicates where each burst is placed in the frame, which MS it is intended for and what modulation level (MCS block 240 in FIG. 2) decodes it. Similarly the UL-MAP 208 indicates where the MS should place its data on the uplink frame 220. The uplink frame 220 also has dedicated sub-channels for hybrid automatic repeat request (HARQ) coding messages, which is used by the MSs to explicitly acknowledge, via an acknowledgement message (ACK) or a negative-acknowledgement message (NACK), to the BS the reception of each burst sent by the BS.

Figure 3:
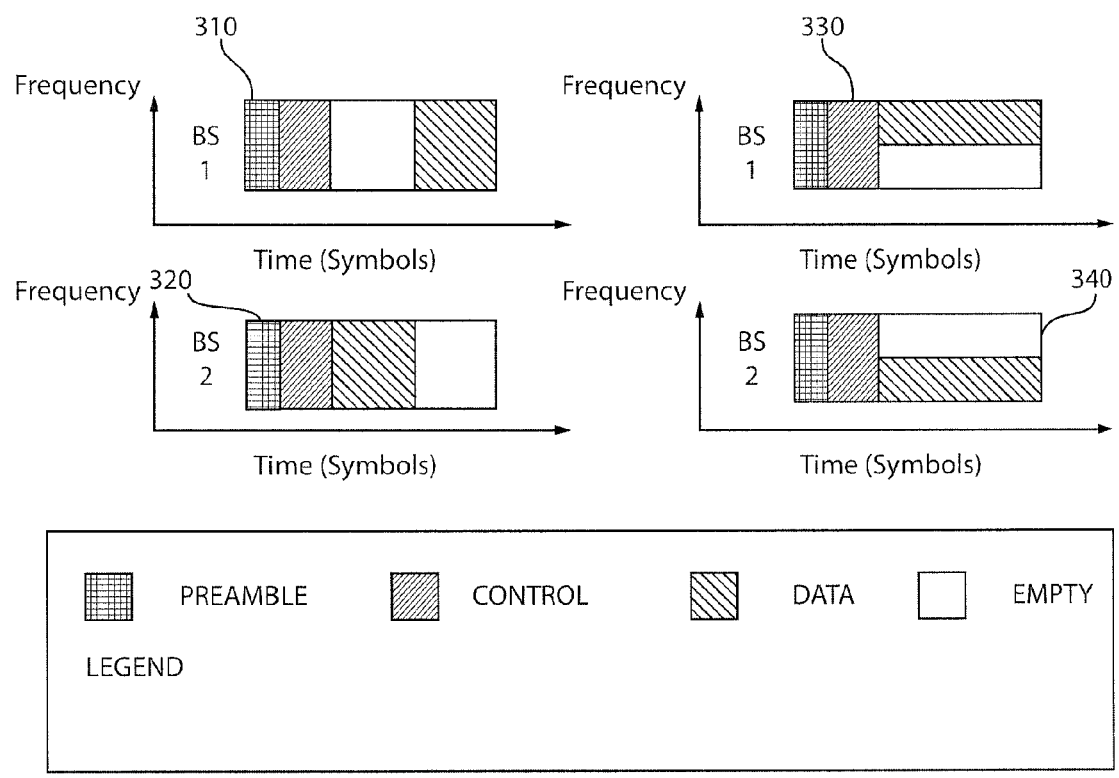
FIG. 3 is a diagram illustrating time domain isolation and frequency domain isolation characteristics.

Turning now to design aspects of embodiments of the present principles, it should be noted that the locations of the clients or MSs, rather than the BSs, and determinations of whether they are subject to interference are important factors in an OFDMA setting where there is no carrier sensing. There are a plurality of possible approaches to coping with interference in OFDMA. Switching to a lower MCS via link adaptation (rate control) could suffice if the received signal quality is above the threshold for the lower MCS level. With strong interference, typical in dense deployments, the received Signal to Interference plus Noise Ratio (SINR) could be even lower than that the threshold specified for the lowest MCS operation. Isolating the resources, for example, tiles, utilized by interfering cells assists in alleviating the effects of interference, but the isolation of resources results in a reduced set of tiles in each cell. The choice between link adaptation and resource isolation should be made based on the nature of interference. In a two-dimensional WiMAX frame, the tiles can be isolated among BSs either in the time (symbols) or in the frequency (sub-channels) domain as depicted in FIG. 3. Block 310 of FIG. 3 illustrates the assignment of resources to a first base station and block 320 illustrates the assignment of resources to a second base station in accordance with time domain isolation (TDI). In addition, block 330 illustrates the assignment of resources to a first base station and block 340 illustrates the assignment of resources to a second base station in accordance with frequency domain isolation (FDI). TDI isolates tiles by leaving empty (guard) symbols to prevent collisions, while FDI allocates orthogonal sets of sub-channels to different BSs for their transmissions.

The inventors have observed that FDI leads to an interesting phenomenon denoted here as power pooling, which is only possible with FDI. The energy transmitted by a BS is split over its constituent sub-channels in OFDMA. With a smaller subset of sub-channels, the average power per sub-channel increases, potentially permitting the cell to operate using a higher level MCS. As more cells are activated in an interference domain, the number of (orthogonal) sub-channels available per cell decreases; this however, increases the average available power and hence the throughput per sub-channel. Eventually, the higher per sub-channel throughput in each cell contributes to the higher network throughput capacity.

Further, based on experiments, the inventors have also deduced that, for clients in close proximity to their respective BS, link adaptation alone may be sufficient to cope with interference. Invoking resource isolation for such clients will underutilize tiles in the frame. Given that OFDMA multiplexes data to multiple clients in a given frame (to fill the available tiles), clients with heterogeneous characteristics (link adaptation vs. resource isolation) should be accommodated in the same frame. To achieve this, zoning can be applied, where an OFDMA frame is divided into two data transmission zones. A zone is a dedicated portion of the frame in which one or more bursts can be scheduled. Here, the first zone (hereafter referred to as the reuse zone) operates on all sub-channels and is used to schedule clients that need just link adaptation. The second zone utilizes only a subset of sub-channels (determined by FDI) and, here, the clients that need resource isolation are scheduled in the second zone (referred to as the resource isolation zone). As long as the reuse client does not experience a substantial amount of interference from a neighboring femtocell, reusing sub-channels provides a throughput gain over the pure resource isolation scheme. It should be further noted that link adaptation is also performed for clients in the resource isolation zone albeit only within the restricted subset of sub-channels.

Although zoning holds promise and itself has inherent value, it only dictates how to accommodate heterogeneous clients; it does not provide a complete resource management solution. Specifically, for each cell, an appropriate resource management scheme should (a) determine the size (in symbols) of the reuse zone; (b) determine the subset of sub-channels allocated to the resource isolation zone; and (c) adapt both of these zones to the dynamics of the network in a scalable manner. As described in more detail herein below, embodiments of the present principles incorporate novel techniques to address these challenges.

To aid in understanding specific motivations with regard to methods employed herein, an overview of several general observations and inferences made by the inventors based on femtocell experiments will now be provided. For example, strong interference in femtocells cannot be alleviated by just link adaption; as such, resource isolation should be employed. Isolating resources in the frequency domain can increase throughput capacity due to power pooling. In addition, resource isolation, even when achieved on only the data payload portion of a frame, can still alleviate interference. Further, having contiguity in sub-carriers (forming a sub-channel) reduces the vulnerability to frequency offsets that can cause interference across cells even when resources are isolated at the MAC level. Altering the sub-carrier composition of sub-channels via different permutations at the physical layer (PHY) (of the OSI model) provides a diversity gain but does not outweigh the benefits of interference reduction from isolation of sub-channels at the MAC. Isolating resources in the frequency domain and retaining contiguity in sub-carriers to address interference holds promise even in the absence of synchronization.

Figure 7:
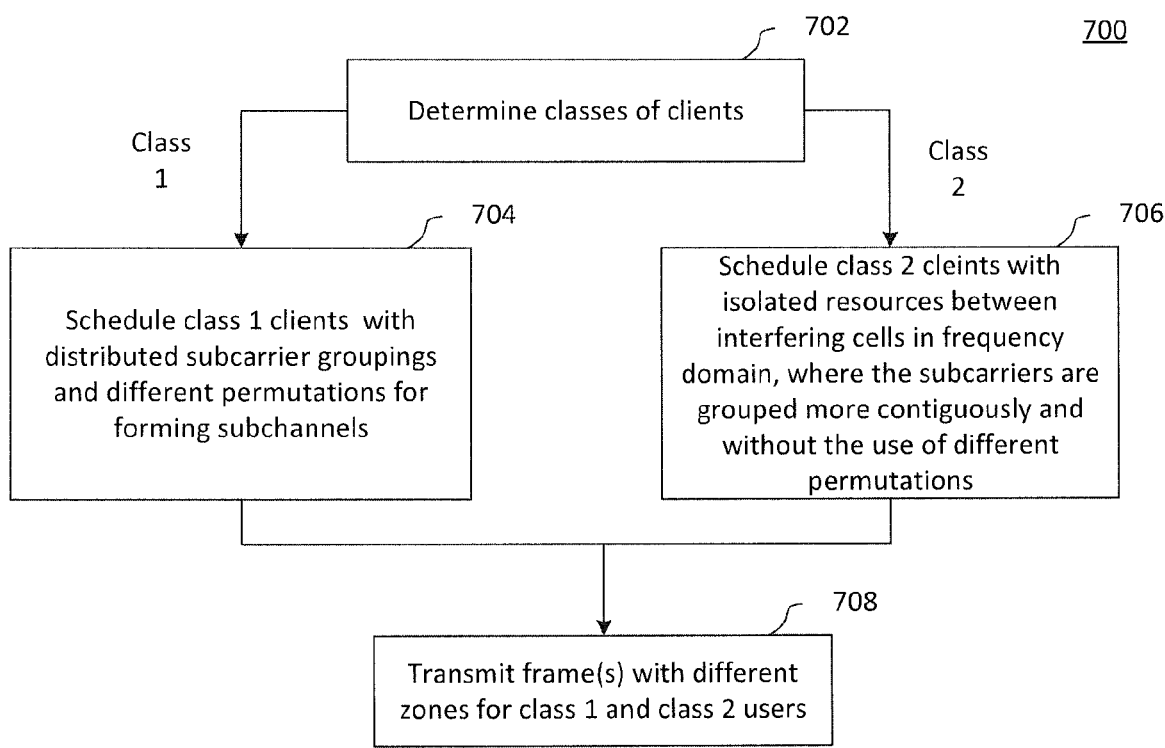
FIG. 7 is a block/flow diagram of a method for managing resources in femtocells in accordance with an exemplary embodiment.

Based on these inferences, a general method 700 for mitigating interference in a multicell OFDMA femtocell system has been devised. A flow diagram of the method 700 is illustrated in FIG. 7. The method 700 can begin at step 702, at which the controller 106 of the base station 101, shown in FIG. 1, can determine the classes of clients 102 that the base station 101 serves based on interference indications determined for the clients or mobile stations 102. For example, as noted above, Class 1 clients are clients that have throughput benefits from reusing the spectrum as opposed to having an isolated set of resources. In addition, Class 2 clients are clients that have throughput benefits from interference mitigation via isolation of resources from interfering femtocells. In accordance with one example, the throughput of each client can be used as an interference indication to distinguish between class 1 clients and class 2 clients, as described in further detail herein below with respect to a more specific method implementation. According to one exemplary aspect, here, in this embodiment, class 1 clients can be viewed as those clients for which interference between femtocells does not prevent decoding with lower bit-rate MCSs. In turn, class 2 clients can be viewed as those clients for which interference between femtocells is sufficiently strong in that it does prevent decoding with lower bit-rate MCSs. Thus, class 2 clients suffer from stronger interference than class 1 clients.

Figure 4:
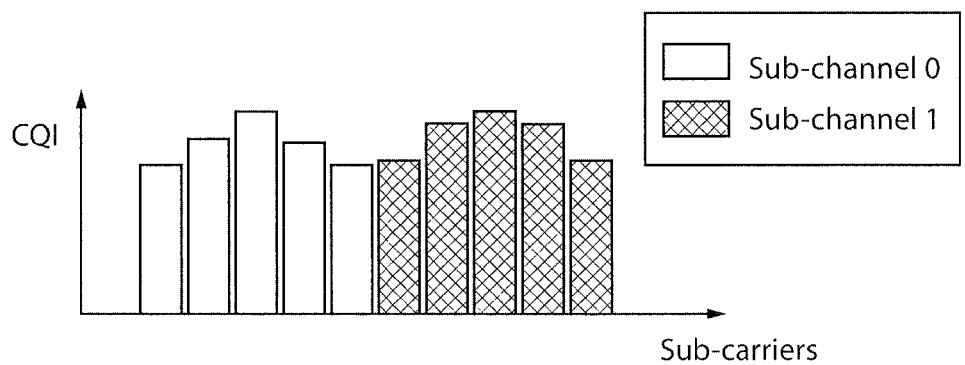
FIG. 4 is a diagram illustrating an association of sub-carriers into sub-channels in accordance with an adaptive modulation and coding (AMC) grouping option.
Figure 5:
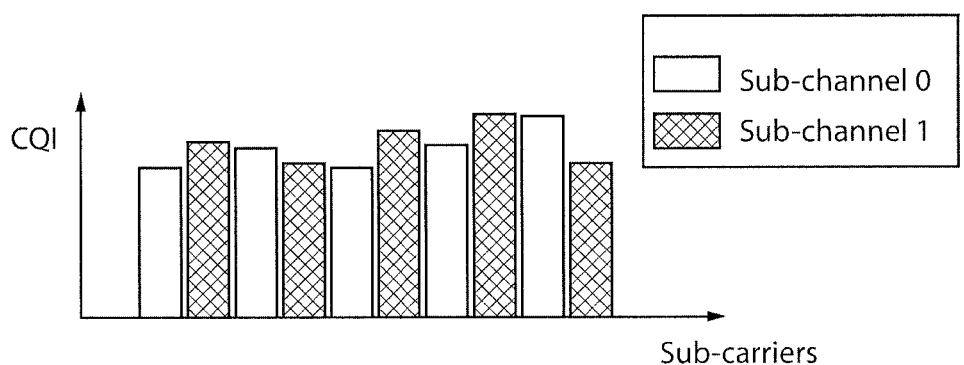
FIG. 5 is a diagram illustrating an association of sub-carriers into sub-channels in accordance with a full usage of sub-carriers (FUSC) grouping option.
Figure 6:
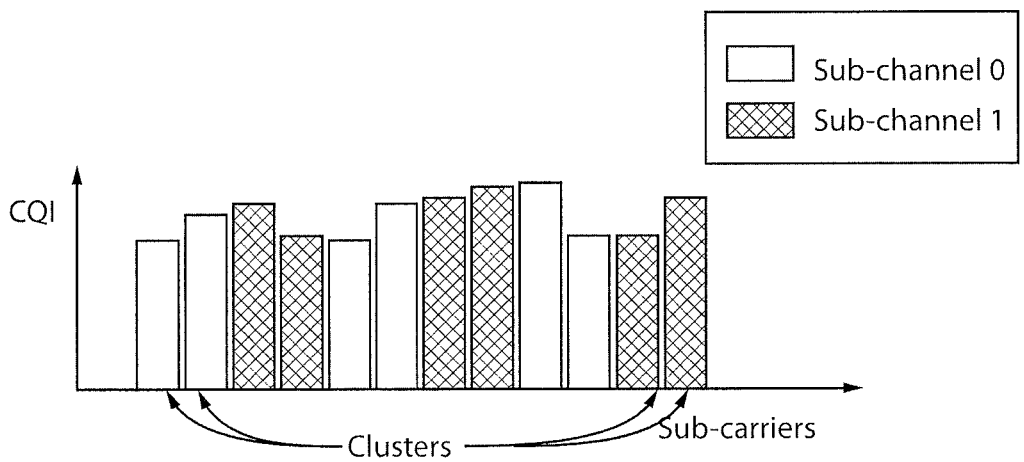
FIG. 6 is a diagram illustrating an association of sub-carriers into sub-channels in accordance with a partial usage of sub-carriers (PUSC) grouping option.

For class 1 clients, the controller 106, at step 704, directs the scheduler to schedule class 1 clients and construct one or more frames as follows: a) utilize distributed sub-carrier grouping (e.g. FUSC) to form sub-channels since this reduces the control signaling oven-head, while making more room for data transmissions; and b) utilize different permutations at the PHY level to leverage the diversity gain resulting from it. "Full usage of sub-carriers" (FUSC) is one of a plurality of options offered by WiMAX for grouping of subcarriers to form a sub-channel. One aspect of grouping is related to the degree of contiguity in the sub-carriers. In particular, WiMAX provides three options here: a) FUSC: sub-carriers composing a sub-channel are picked in a completely distributed manner from the spectrum; b) PUSC (partial usage of sub-carriers): sub-carriers are first grouped into clusters and distributed clusters are then grouped to form a sub-channel; and c) AMC (adaptive modulation and coding): contiguous set of sub-carriers are grouped to form a sub-channel. The three options are illustrated in FIGS. 4-6, which depict graphs 400, 500 and 600 of channel quality information (CQI) v. sub-carriers and show subcarrier groupings to form two sub-channels, sub-channel 0 and sub-channel 1, for each case. In particular, FIG. 4 illustrates the AMC case, FIG. 5 illustrates the FUSC case and FIG. 6 illustrates the PUSC case. In accordance with FUSC, as shown in FIG. 5, FUSC associates essentially non-contiguous sub-carriers into sub-channels. In turn, in the PUSC case, the association of sub-carriers into sub-channels is performed in a more contiguous manner than the FUSC case. AMC has perfect contiguity and hence retains the frequency selectivity of user channels. However, leveraging this diversity involves feedback of CQI on all sub-channels from all users. FUSC loses frequency selectivity due to lack of contiguity, but uses only one CQI feedback (an average over the spectrum) for each user. PUSC strikes a good balance between frequency selectivity and overhead; it retains some contiguity via sub-carrier clustering and feeds back one CQI value similar to FUSC. The inventors have found that distributed sub-carrier grouping (FUSC) is more vulnerable to frequency offsets across cells than PUSC. This degrades performance in the presence of interference. Further, FUSC can isolate resources only for the data part, unlike PUSC, and, hence, is limited in addressing interference. In cases without interference, FUSC outperforms PUSC due to s higher number of available sub-carriers.

Once the degree of contiguity is decided, how the sub-carriers are selected should be determined. This can be achieved by using pre-defined permutations in 802.16e. In particular, permutations of sub-carriers for association into sub-channels change over time. A total of 16 and 8 permutations are available with PUSC and FUSC, respectively. These pre-defined permutations can be employed in sub-step b) of the general method for mitigating interference described above. With regard to the use of different permutation in PUSC, the spectrum is first divided into 14 contiguous sub-carrier sets called clusters. Then, the physical clusters are shuffled as per a pre-determined renumbering sequence; these form the logical clusters, which are then gathered under major groups as shown in Table 1 below.

TABLE 1

Sub-channel formation with the use of pre-defined permutations

| Logical Clusters | Major Groups | Sub-channels |
| --- | --- | --- |
| 0-11 | 0 | 0-5 |
| 12-19 | 1 | 6-9 |
| 20-31 | 2 | 10-15 |
| 32-39 | 3 | 16-19 |
| 40-51 | 4 | 20-25 |
| 52-59 | 5 | 26-29 |

In accordance with Table 1, two logical clusters within a group are combined to form a sub-channel; thus, 30 sub-channels can be formed from 60 physical clusters. WiMAX uses the following formula to renumber the physical clusters: $LN = R(PN + 13 \cdot permbase) \mod N_{clusters}$ where LN is the logical cluster number, PN is the physical cluster number and R is the renumbering sequence. Varying the permutation base (permbase) changes the set of physical clusters forming a sub-channel. Two cells with orthogonal sub-channels (at the MAC) can still collide on some sub-carriers at the PHY (if their permutations cause this to happen).

Returning to the general method for mitigating interference, in the presence of strong interference, for class 2 clients, the controller 106, at step 706, directs the scheduler 104 to schedule class 1 clients and construct one or more frames as follows: a) isolate resources between interfering cells in the frequency domain to increase capacity; b) use contiguity in sub-carriers (e.g. PUSC) to alleviate the adverse impact of frequency offsets across cells; and c) employ a consistent or constant permutation of subcarriers for the sub-channels at the PHY level over time and thereby trade-off permutation gain for significant interference reduction through MAC layer resource isolation. The controller 106 can determine which resources to isolate and on which resources to schedule its class 2 clients by receiving instructions indicating the same from the central controller 120. The central controller 120 can receive information concerning the existence of class 2 clients from a plurality of base stations 101 in a given area through the network 122 and can allocate portions of resources dedicated for isolation to the respective base stations to ensure that the resources allocated to adjacent base stations do not overlap and are isolated from each other.

At step 708, the controller 106 can direct the transmitter 109 to transmit one or more downlink frames to the clients 102 by utilizing different zones for class 1 and class 2 clients. As noted above, a zone is a dedicated portion of the frame in which one or more bursts can be scheduled. Here, the scheduling features described above with respect to steps 704 and 706 are incorporated into each frame.

The method 700 provides an efficient resource management solution for femtocells. There are some interesting implications that arise in the method. When interference is tolerable (via link adaptation), isolating resources will degrade performance. Hence, mechanisms that differentiate between fading and interference and appropriately trigger link adaptation or resource isolation can be employed, as described further herein below. Interference estimation capabilities may be performed using calibrating measurements or with the help of external sensors. When a cell has multiple MSs experiencing different levels of interference, the scheduling decisions (use of resources) should intelligently incorporate link adaptation and resource adaptation in tandem. Network dynamics in the form of deployment of new cells, removal of existing cells, load variations, etc., can be factored in when designing distributed mechanisms.

Figure 8:
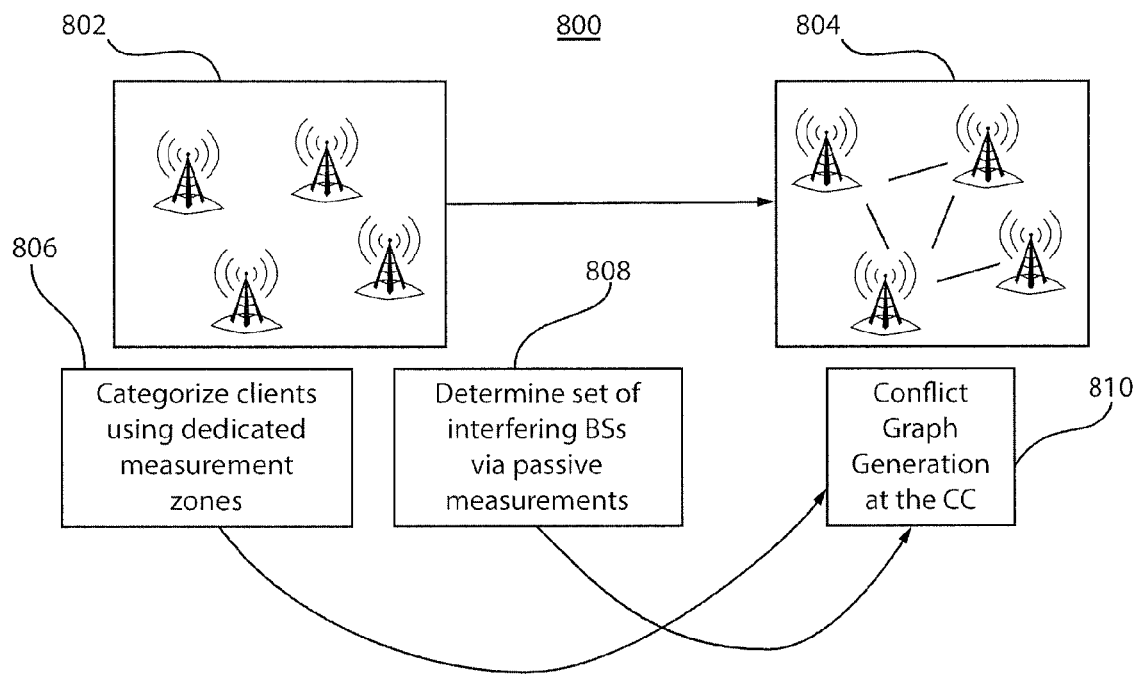
FIG. 8 is a block/flow diagram of an overview of a method for managing resources in femtocells in accordance with an alternative exemplary embodiment.

Prior to describing more specific methods for managing resources for interference mitigation, an overview 800 of the methods is provided in FIG. 8. Here, a set 802 of base stations 101 are analyzed to determine a conflict graph 804. In particular, at block 806, clients are categorized using dedicated measurement zones. The categorization of clients permits each BS to determine how the frame should be divided into zones, from its perspective. Each BS, at block 808, then determines the set of BSs that cause interference on those of its clients that need resource isolation. This information, along with cell-specific load parameters, is then fed to the central controller 120, which then constructs an interference map or conflict graph at block 810. The interference map is based on the lists of interferers provided by the base stations determined at block 808 and on load parameters determined at block 806. Using the interference map (i.e., conflict graph), the CC 120 computes the network wide sub-channel allocation and zoning parameters, as described in further detail herein below. The CC 120 disseminates this information back to the BSs, which use these operational parameters until the next resource allocation update.

Turning now to client categorization at the BS, the BS can categorize clients into two classes: the first needs just link adaptation (class 1) while the second needs resource isolation together with link adaptation (class 2), as discussed above. To understand how clients are to be categorized as either class 1 or class 2, we perform calibration experiments. We consider two cells, each with a single client. We experiment over a large set of client locations to generate a plurality of scenarios. We first consider a cell in isolation (i.e., no interference). At each client location, we experiment by sequentially allocating two spectral parts (of equal size) of the frame to the client. Since the fading effects on the two sets of assigned sub-channels are likely to be different, the client will receive different throughputs with the two different allocations. We notice however, that the difference between the two allocations is at most 25% in more than 90% of the considered client locations. The experiment is repeated, but with interference. In one of the allocations (i.e., parts), the second cell projects interference on the client; in the other, the operations are without interference (via resource isolation). In this case, we observe that there is a throughput difference of over 25% (in many cases, significantly higher) in more than 80% of the topologies.

These results suggest that the throughput (per unit resource) difference at a client between an interference free allocation and an allocation with interference can be used to categorize it as class 1 or class 2. If this difference is less than a threshold, referred to below as $\alpha$, link adaptation suffices for this client. However, if the interference difference is larger than the threshold, it cannot be immediately determined if the client needs resource isolation. This is because the above-described experiments were done by allocating an equal number of tiles to the client in the settings with and without interference. If such a client is categorized as class 2 and allocated a smaller set of isolated resources, based on the cell's load, the throughput it achieves may in fact only be similar to what it would achieve by being a class 1 client. Unfortunately, it may be difficult to know the cell loads a priori and hence one cannot make a clear determination of whether to categorize these clients as class 1 or class 2. Thus, as a design choice, the system can take a conservative approach and categorize all of such clients as class 2. This helps accommodate fluctuations in the load and interference patterns. Alternatively, as discussed further herein below, if the interference is deemed to be larger than the threshold $\alpha$, the class 1 clients can be distinguished from the class 2 clients by initially allocating sizes of the occupied zone and the reuse zone to permit their consideration in the determination of whether the throughput of a client warrants a class 2 designation.

Although a BS does not have access to the throughput at a client, it is informed about the reception of each burst via ACKs and NACKs on the uplink. A Burst Delivery Ratio (BDR) is defined to be the ratio of successfully delivered bursts to the total number of bursts transmitted by the BS. The BS can estimate BDR by taking the ratio of the number of ACKs received to the total number of feedbacks (ACKs+NACKs) received from the clients. Because the feedback itself might practically get lost on the uplink, this is an estimate of the actual BDR. It can be shown that the BS can very accurately track the client throughput using the BDR estimates. In addition, as per the WiMAX standard, the feedback channels on the uplink modulate data using robust QPSK modulation. This helps in reducing the probability of a feedback being received in error by the BS and assists in making the BDR estimate accurate, as it can be assumed that the ACKs and NACKs were accurately received. Similar notions of uplink feedback channels are also enabled in other OFDMA standards, such as LTE.

Figure 9:
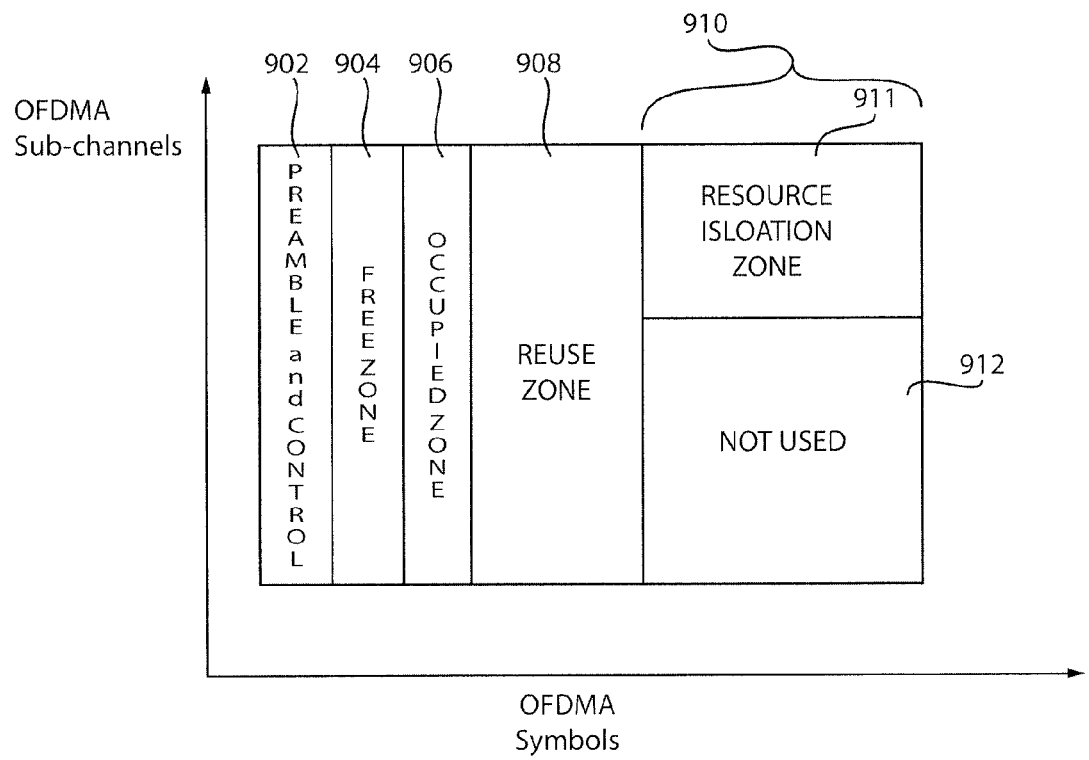
FIG. 9 is a block diagram of a resource frame in accordance with an exemplary embodiment.

To achieve categorization in practice, the system can introduce two measurement zones in the frame, as depicted in FIG. 9, namely the occupied and free zones. As illustrated in FIG. 9, the exemplary frame can include a preamble and control zone 902, a free zone 904, an occupied zone 906, a reuse zone 908, and a resource isolation zone 910, which includes a portion 911 that includes isolated sub-channels that is used in the frame by the BS for transmission to its clients and a portion 912 that is not used in the frame by the BS for transmission to its clients. Every BS operates using all sub-channels in the occupied zone 906. Scheduling a client in this zone enables the BS to calculate the BDR in the presence of interference from other cells. Scheduling a client in the free zone 904 to calculate the BDR without interference is slightly more involved. Given a set of interfering BSs, all BSs but for one must leave the free zone 904 empty in any frame. Allowing only one of the interfering BSs to schedule its clients in the free zone 904 will enable it to measure BDR without interference at its clients. Hence, a random access mechanism with probability $$\frac{\gamma}{n}$$

is emulated to decide access to the free zone, where n is the number of interfering BSs 101 and $\gamma \geq 1$ is a constant parameter set by the CC 120. Note that clients associate with BSs at different instants and hence it is unlikely that all interfering BSs will categorize their clients at the same time. Thus, $\gamma$ is used to increase the access probability to the free zone 904. The system schedules regular data bursts in the measurement zones to calculate the BDR, thereby keeping the process transparent to clients and retaining standards compatibility. While the occupied zone 906 can be used as an extension to the reuse zone 908 when categorization of the clients is completed, this is not possible for the free zone 904, whose utility is towards categorization in other cells. Here, the central controller 120 that keeps track of client (dis)associations, triggers the use of the free zone 904 (cast as a data zone) solely for the purpose of categorization in relevant parts of the network and disables it to minimize overhead once the procedure is complete.

The accuracy of client categorization is evaluated. We consider two cells; clients 1 and 2 belong to the two cells, respectively. We generate multiple topologies by varying the location of client 1 in the presence of interfering cell 2. First, the throughput of client 1 is measured for both zones (free and occupied) to identify the ground truth at each location; here, leveraging our calibration measurements, we conclude that if the throughput difference is less than 25%, client 1 is at a location where it only needs link adaptation. Otherwise, the particular scenario is deemed as one that needs resource isolation. After the ground truth is established, cell 1 collects BDR samples from both measurement zones to decide on the client category. The decision is made based on these samples: if the average free zone BDR is at least $\alpha$ % higher than the average occupied zone BDR, then the client category is class 2. Here, arbitrating the access to the free zone is a factor that reduces the accuracy of estimation. If two BSs schedule their clients in this zone at the same time, rather than getting a BDR sample without interference, they both could get a sample that indicates interference. The BDR average over multiple samples can be used to alleviate such inaccuracy.

Based on the results of the experiment, it can be shown that increasing $\alpha$ beyond 0.25 decreases the accuracy of detecting a need for resource isolation, but, conversely, it increases the accuracy of detecting a need for link adaptation only. Further, while increasing the number of samples over which $\alpha$ is measured can help improve accuracy, the benefits are not significant. Hence, it is preferable to use fewer samples to categorize clients (towards reducing overhead). Thus, the system can use an $\alpha$ of 1 with 25 frame samples to obtain an accuracy greater than 90%.

Turning now to interference map generation, the CC 120 can be configured to generate an interference (conflict) map that not only captures point-to-point but also cumulative interference experienced by the clients. Note that interference is client-dependent and since multiple clients are scheduled in tandem in each OFDMA frame, the interference patterns between BSs vary from one frame to another. This makes it difficult, if not impossible, for any practical resource management scheme to gather schedule-dependent interference information, determine an allocation and disseminate it to the BSs for execution in every frame (sent every 5 ms in WiMAX).

Hence, the goal of the resource management scheme here is to allocate resources at a coarser time scale (over hundreds of frames) by collecting aggregate interference statistics from each BS. This decouples resource allocation from frame scheduling in each BS, thereby permitting a conflict graph approach to adequately capture interference dependencies for our purpose.

In addition to client categorization, the measurement zones 904 and 906 also aid in deciphering interference relations. If a BS causes interference to the clients of another BS to such a degree that the clients need resource isolation, as described above, then an edge is added between the two BSs in the conflict graph. Note that the interference relations need to be determined only for class 2 clients. The controller 106 of the BS uses the measurements in the occupied zone as the basis to categorize a client as class 2. Note however that all BSs in the set 802 operate in this zone and, thus, the client experiences the cumulative interference from all interfering BSs. Adding an edge to each of these neighboring cells in the conflict graph would be overly conservative; some of them may only project weak levels of interference on the client. Hence, the CC 120 can determine the minimum set of interference edges that need to be added in the conflict graph to eliminate interference through resource isolation. Towards this, the CC 120 implements the following procedure following the initial categorization.

Consider a femtocell A and a class 2 client c1 of A. c1 passively measures the received power from neighboring BSs (available during handover between BSs). If the power from a neighboring BS (B) exceeds a threshold, then B is added to c1's list of strong interferers. c1 reports this list to A, which then consolidates it and reports the set of conflict edges (for each strong interferer) that should be added to the conflict graph to the CC 120. The CC 120 uses this information for making the initial resource allocation decision. While this accounts for point-to-point interference, some clients may not see any individual strong interferer but the cumulative power from a subset of neighbors could be strong enough to render a need for resource isolation. Such clients will continue to see interference after the initial resource allocation. These clients can be identified by comparing the BDR achieved on the assigned sub-channels in the resource isolation zone with that seen in the free zone. An iterative approach can be adopted to further refine the conflict graph to isolate such clients. To illustrate, let us consider one such client. We consider all the interfering cells for this client and add an edge in the conflict graph to the cell that causes the highest (in power) interference subject to a filtering based on the initial allocation. If the BDR for the client is sufficiently improved and is now within $\alpha$ % of what is observed in the free zone, the process is complete. If not, the next strongest interfering BS is added to the conflict graph (again subject to filtering based on the previous allocation) and so on.

Using only the passive received power measurements from interfering BSs may seem to be an easier approach to categorize clients. Here, if a client receives a signal from an interfering BS that is higher than a threshold, it is categorized as class 2; otherwise, it is a class 1 client. However, for this method to work well in practice, a substantial amount of calibration is needed to find accurate, often scenario-dependent, threshold values. In addition, the received power does not necessarily give an indication of the throughput observed at the clients. To avoid these practical issues, the system employs highly accurate direct measurements for client categorization, as discussed above, which permits it to have coarse thresholds for identification of strong interferers.

Having categorized the clients and identified the interference dependencies between femtocells, resource allocation algorithms that can be executed by the CC 120 is now described.

In accordance with exemplary embodiments, a goal of resource management at the CC 120 is to determine, for each femtocell, (i) the size of the reuse zone and, (ii) the specific subset of sub-channels for operations in the resource isolation zone, to obtain an efficient and fair allocation across femtocells. While the joint determination of parameters for both of the zones is the optimal approach, this depends on throughput information that changes in each frame, thereby coupling resource allocation with per-frame scheduling decisions. Since, as noted above, per-frame resource allocation is infeasible due to practical constraints, embodiments described herein perform resource allocation at coarser time scales.

Each femtocell 101 reports two parameters to the CC 120 to facilitate resource allocation: (i) load, for example, the number of clients, in its resource isolation zone, and (ii) desired size, for example, in time symbols, of its reuse zone. Alternative definitions for load can be adopted but the number of clients is sufficient for our purposes. Note that a femtocell 101 does not have the complete picture of interference dependencies across cells; it only has a localized view. Thus, it simply provides the load in its resource isolation zone and expects the CC 120 to allocate resources proportional to its load. Each femtocell 101 determines the desired size of its reuse zone based on the relative load in the two zones. Since class 2 clients will be scheduled immediately after the reuse zone, for example, as shown in FIG. 9, if two interfering cells have different sizes for their reuse zones, then the cell with the larger reuse zone will cause interference to the class 2 clients of the other cell. Hence, an appropriate size for the reuse zone of each cell should also be determined by the CC 120 based on the reported desired values. One exemplary algorithm that the CC 120 can employ to determine the sub-channel allocation and assignment to each femtocell 101 is described herein below, followed by a description of how the CC 120 can select the size of their reuse zones.

A goal of sub-channel allocation is to allocate and assign sub-channels to the resource isolation zone in each femtocell so as to maximize the utilization of sub-channels in the network subject to a weighted max-min fairness model. The reasons for the choice of the weighted max-min fairness are two fold: (i) weights account for variations in load across different cells; and (ii) max-min permits for an almost even split of sub-channels between cells in a contention region, which in turn maximizes the benefits from power pooling mentioned above. Thus, given the load for the resource isolation zone from each femtocell along with the conflict graph constructed, CC 120 aims to determine a weighted (load-based) max-min allocation of sub-channels to femtocells (i.e. vertices in the graph).

THEOREM 1. The sub-channel allocation and assignment problem is NP-hard.

The proof is omitted here for purposes of brevity.

While the allocation problem may seem similar to multi-coloring at the outset, this is not the case. In fact, multi-coloring can only provide an assignment of sub-channels for a specified allocation.

However, the CC 120 also determines a weighted max-min allocation in addition to the assignment, which makes the problem much more challenging. Further, every contiguous set of sub-channels allocated to a cell is accompanied by an information element in the control part of the frame (MAP), describing parameters for its decoding at the clients. This constitutes overhead, which in turn increases with the number of discontiguous sets allocated to a cell. Therefore, the CC 120 should be configured to reduce overhead due to discontiguous allocations, while ensuring an efficient allocation of sub-channels.

Any resource allocation algorithm attempts to allocate shared resources between entities in a contention region subject to a desired fairness. Each contention region corresponds to a maximal clique in the conflict graph. However, a given femtocell may belong to multiple contention regions and its fair share could vary from one region to another. This makes it difficult to obtain a fair allocation, for which all maximal cliques in the graph should be identified. However, there are an exponential number of maximal cliques in general graphs with no polynomial-time algorithms to enumerate them. As such, the CC 120 can implement an alternate, novel approach to resource allocation by applying $A^3$, outlined below in Table 2. $A^3$ runs in polynomial time and provides near-optimal fair allocation with minimal discontiguity (overhead).

TABLE 2

Algorithm 1 Allocation and Assignment Algorithm: $A^3$

1: Triangulate: $A^3$ first transforms the given conflict graph G into a chordal graph G' by adding a minimal set of virtual interference edges to G = (V, E).
2: Allocate and Assign: $A^3$ computes a provably weighted max-min allocation on the chordal graph G'.
3: Restore: $A^3$ removes the virtual edges from G' and updates the allocation to the vertices carrying the virtual edges to restore a fair allocation on the original graph G.

It should be noted that a chordal graph does not contain cycles of size four or more. Chordal graphs have significant applications in sparse matrix computations and have been extensively studied. Algorithms for important problems such as maximum clique enumeration can efficiently be applied on chordal graphs. An important idea in $A^3$ is to leverage the power of chordal graphs to obtain a near-optimal allocation. Details of the three steps in $A^3$ are described herein below along with a running example in FIG. 10.

Figure 10:
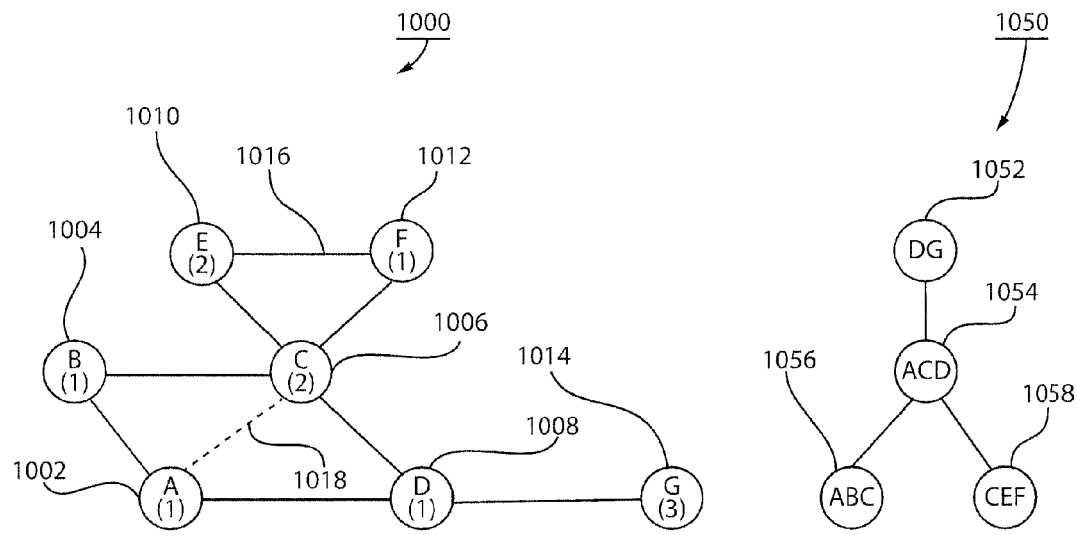
FIG. 10 is a diagram illustrating a chordal graph and a clique tree determined in accordance with an exemplary embodiment.

To illustrate an implementation of $A^3$, reference is made to FIG. 10, which depicts a chordal graph 1000 including representations of femtocell base stations A 1002, B 1004, C 1006, D 1008, E 1010, F 1012 and G 1014. The loads in each of the femtocell base stations are indicated in parentheses in FIG. 10. The chordal graph also includes edges 1016 that were included in the conflict graph and an edge 1018 added by the triangulation step of $A^3$. FIG. 10 also illustrates a clique tree 1050 for the chordal graph 1000 that includes maximal cliques 1052-1058 formed by $A^3$, as discussed in more detail herein below. Table 3, herein below, lists the initial and final allocation sizes, sub-channel assignments and other aspects determined in accordance with $A^3$ for the base stations A 1002-G 1014. In Table 3, [a:b] denotes the set of sub-channels from a to b (inclusive).

TABLE 3

| Vertex | Initial Allocation | Assignment | Restoration | Final Allocation | Benchmark |
|---|---|---|---|---|---|
| C | min(8, 10, 10) | [12:19] | none | 8 | 8 |
| D | min(6, 5) | [1:5] | N/A | 5 | 5 |

TABLE 3-continued

| Vertex | Initial Allocation | Assignment | Restoration | Final Allocation | Benchmark |
|---|---|---|---|---|---|
| G | 15 | [6:20] | N/A | 15 | 15 |
| E | 8 | [1:8] | N/A | 8 | 8 |
| A | min(7, 6) = 6 | [6:11] | [12:19] | 14 | 10 |
| F | 4 | [9:11] + [20] | N/A | 4 | 4 |
| B | 6 | [1:5] + [20] | N/A | 6 | 10 |

With regard to the triangulation step, the process of adding edges to chordalize (triangulate) a graph is referred to as fill-in. Since adding edges to the conflict graph would result in a more conservative allocation than is needed, the goal is to add the minimum number of edges needed for triangulation. While this is an NP-hard problem in itself, $A^3$ employs a maximum cardinality search-based algorithm that is guaranteed to produce a minimal triangulation and runs in time $O(|V||E|)$, where V is the set of vertices and E is the set of edges in the graph. As indicated above, FIG. 10 depicts a fill-in edge 1018 between vertices A 1002 and C 1006. As described further herein below, the restoration (third) step in $A^3$ is used to alleviate the under-utilization introduced by the triangulation.

Turning now to the allocation step in $A^3$, Algorithm 2 depicted in Table 4, below, can be used to determine the weighted max-min allocation on the triangulated graph G'.

TABLE 4

Algorithm 2: Weighted Max-min Fair Allocation Algorithm

1: INPUT: G' = (V, E') and load $l_i$, $\forall v_i \in V$
2: Allocation:
3: Un-allocated vertices $v = V$, Allocated vertices $A = \theta$
4: Determine all the maximal cliques $C = \{C_1, \ldots, C_m\}$ in G' using perfect elimination ordering
5: Resource:, $R_j = N$, Net load: $L_j = \Sigma_{i:v_i \in C_j} l_i$, $\forall C_j$
6: Determine tuples: $s_i = \max_{j:v_i \in C_j}\{L_j\}$, $t_i = \Sigma_j 1_{v_i \in C_j}$, $\forall v_i$
7: Determine initial allocation:

$$A_i = \min_{j:v_i \in C_j} \left\lfloor \frac{l_i R_j}{\Sigma_{k:v_k \in C_j} l_k} + 0.5 \right\rfloor, \forall v_i \in v$$

8: while $v \neq \theta$ do
9: Pick un-allocated vertex with maximum lexicographic rank: $v_o = \arg \max_{i:v_i \in v}(s_i, t_i)$
10: Allocate $A_o$ sub-channels to $v_o$; $v \leftarrow v \setminus v_o$, $A \leftarrow A \cup v_o$
11: Update remaining resource: $R_j = R_j - A_o$, $\forall j:v_o \in C_j$
12: Remove $v_o$ from cliques: $C_j \leftarrow C_j \setminus \{v_o\}$, $\forall j:v_o \in C_j$; Update $L_j \forall_j$ and $(s_i, t_i) \forall v_i \in v$
13: Update allocation:

$$A_i = \min_{j:v_i \in C_j} \left\lfloor \frac{l_i R_j}{\Sigma_{k:v_k \in C_j} l_k} + 0.5 \right\rfloor, \forall v_i$$

14: end while

Once the graph is triangulated, all its maximal cliques are listed in linear time $(O(|V|))$ by determining a perfect elimination ordering (PEO). $A^3$ determines the net load on each maximal clique (step 5 of Algorithm 2) and for every un-allocated vertex (cell, $v_i$), it determines a tuple $(s_i, t_i)$, where $s_i$ indicates the highest load in the cliques that $v_i$ belongs to and $t_i$ is the number of cliques that it belongs to (step 6 of Algorithm 2). $A^3$ then determines a vertex's weighted fair share in each of the maximal cliques that it belongs to and determines its minimum (rounded) share amongst all its member cliques (step 7 of Algorithm 2). It picks the vertex ($v_o$) with the highest lexicographic rank and allocates the computed share of sub-channels to it (vertex C is picked first with $s_c=5$ and $t_c=3$). $v_o$ is then removed from the list of un-allocated vertices (steps 8-10 of Algorithm 2). The allocated vertex is also removed from the cliques that it is a member of, and the clique loads, resource and vertex tuples are correspondingly updated (steps 11, 12 of Algorithm 2). The weighted share for the remaining set of un-allocated vertices in each of the maximal cliques that $v_o$ belongs to is updated based on the remaining resources in those cliques (step 13 of Algorithm 2). The process is repeated until all vertices receive allocation and runs in time $(O(|V|^2))$.

Turning now to the assignment step in $A^3$ after the vertices get their weighted max-min allocation, the next step is to provide an actual assignment of sub-channels to satisfy the allocations. $A^3$ leverages clique trees for this purpose. A clique tree for a chordal graph G is a tree whose nodes are maximal cliques in G. Further, it satisfies some useful properties.

$A^3$ generates a clique tree 1050 for the chordal graph G' 1000, as depicted in FIG. 10, in linear time by building on top of a PEO or by constructing a maximum spanning tree. It picks an arbitrary node in the clique tree as its root and starts sub-channel assignment proceeding from the root to its leaves. At every level in the tree, it assigns sub-channels to un-assigned vertices in each of the nodes (maximal cliques) based on their allocation (vertex D 1008 is assigned first with sub-channels [1:5]). When assigning sub-channels to a vertex, it picks a contiguous set of sub-channels that is disjoint with existing assignments to other vertices in the same clique. When contiguous assignment is not possible, $A^3$ makes the assignment to minimize fragmentation (e.g. vertex B is assigned two fragments). Since a vertex may belong to multiple maximal cliques, once its assignment is made, it is retained in all subsequent levels of the tree. It can be shown that the above-described procedure, which runs in $O(|V|)$, can yield a feasible assignment of sub-channels (i.e. proper coloring of G') to satisfy the allocation.

Referring now to the restoration step in $A^3$, it is noted that fill-in edges could result in conservative (underutilized) allocation of resources. While the triangulation in $A^3$ attempts to reduce the addition of such edges, it is preferable to employ another step to restore potential under-utilization. $A^3$ revisits vertices that carry fill-in edges and removes such edges one by one. When a fill-in edge is removed, the removal of a conflict may free up some sub-channels at each of the vertices carrying the edge. If so, the largest set of such sub-channels (that do not conflict with the assignment of neighbor vertices) are directly assigned to those vertices. For example, for vertex A 1002, sub-channels [12:19] are freed after the conflict removal with C 1006 and can be re-assigned to A 1002. This can be done in $O(|V|)$.

To summarize, given the exponential number of cliques in the original graph, $A^3$ intelligently transforms the graph into a chordal graph with only a linear number of cliques and optimally solves the allocation and assignment problem. $A^3$ keeps the potential underutilization due to virtual edges to a minimum with its triangulation and restoration components. Thus, it provides near-optimal performance for most of the topologies with a net running time of $O(|V||E|)$.

Two key properties of $A^3$ are now established.

PROPERTY 1: $A^3$ produces a weighted max-min allocation on the modified graph G'.

PROPERTY 2: $A^3$ always produces a feasible assignment of sub-channels for its allocation.

Proofs are omitted for purposes of brevity.

THEOREM 2: If G is chordal, then $A^3$ produces an optimal weighted max-min allocation.

It can be shown that over 70% of the topologies are chordal to begin with for which $A^3$ is guaranteed to yield an optimal allocation. For the remaining topologies, $A^3$'s sub-optimality is within 10%, indicating its near optimal allocation capability.

It should be noted that there are other possible comparative approaches that can be employed. For example, while greedy heuristics for multi-coloring do not address the allocation problem described above, to understand the merits of $A^3$, we propose and consider two extensions to such heuristics that also perform allocation and assignment (coloring). These simpler heuristics do not need to operate on a complete list of maximal cliques, as described further herein below.

The first heuristic is progressive (labeled prog); here, the allocations and assignments are made in tandem one sub-channel at a time. The vertex with the smallest weighted allocation $$\left(\frac{\text{allocation}}{\text{load}} = \frac{A_i}{l_i}\right)$$

is chosen and assigned the smallest indexed sub-channel that is available in its neighborhood. By assigning sub-channels one at a time, this heuristic is able to achieve reasonable fairness. However, its running time is $O(|V|^2 N)$, where its dependence on N (number of sub-channels) makes it pseudo-polynomial, thereby affecting its scalability. Further, it results in a highly fragmented assignment of sub-channels to vertices, which in turn increases the control overhead in frames.

Another heuristic that can avoid the pseudo-polynomial complexity is interference-degree based (labeled deg). The share to every vertex is determined based on its weight and the remaining resources (after removing allocated vertices) in its interference neighborhood and is $$\frac{l_i \left(N - \sum_{j:(v_i,v_j) \in E, v_j \in \mathcal{A}} A_j\right)}{\sum_{j:(v_i,v_j) \in E, v_j \in \mathcal{U}} l_j}.$$

Then the vertex with the minimum share is allocated as contiguous of a set of sub-channels as possible. This heuristic runs in $O(|V|)$ and also keeps the overhead low. However, its fairness is significantly worse as compared to prog.

By adopting a greedy approach, heuristics derived from multi-coloring either achieve low complexity and overhead at the cost of fairness but not both. $A^3$ however, deciphers interference dependencies with good accuracy to provide both near-optimal fairness and reduced complexity and overhead. Further, since the allocation and assignment is conducted on the chordal graph G', dynamics in the form of arrival/departure of clients/cells (i.e. addition/deletion of conflict edges) can be easily accommodated in a purely localized manner through incremental schemes. This in turn permits $A^3$ to scale well to network dynamics unlike other heuristics.

To understand how close $A^3$ is to the optimum, the weighted max-min allocation on the original graph G (that is not necessarily chordal) should be obtained. This involves listing all of the maximal cliques, which are exponential in number. However, this can be achieved in a brute-force manner with exponential complexity. Once all the maximal cliques are obtained on G, the allocation procedure of $A^3$ can be directly applied to obtain a weighted max-min allocation on G.

As described above, the assignment of sub-channels to the resource isolation zone of each cell has been addressed. The next step is to determine the size of the reuse zone (in symbols) for each cell based on their desired sizes. There arise three challenges in determining the reuse zone size (referred to as $s_r$). (i) If two interfering cells use two different $s_r$'s, the one with the larger $s_r$ will cause interference to the class 2 clients of the other cell. Hence, a common reuse zone is needed among interfering cells. (ii) Since allocation and zoning are meant to operate at coarse time scales (decoupled from per-frame scheduling), the common $s_r$ among interfering cells cannot be determined based on throughput. As such, the choice of the common $s_r$ should be restricted to either the minimum or maximum of the desired zone sizes of the neighboring cells. (iii) If each cell belongs to a single contention region (clique), choosing the common $s_r$ is easy. However, since cells may belong to multiple cliques, this will result in a common $s_r$ (minimum or maximum) that propagates to the entire network. Cells with a desired zone size less than the common $s_r$ may not have sufficient data for their class 1 clients to fill up to the $s_r$, while cells with a larger desired zone size will have to perform isolation (without reusing sub-channels). Either case results in under-utilization, which is exacerbated when a single common $s_r$ is permitted to propagate to the network.

Figure 12:
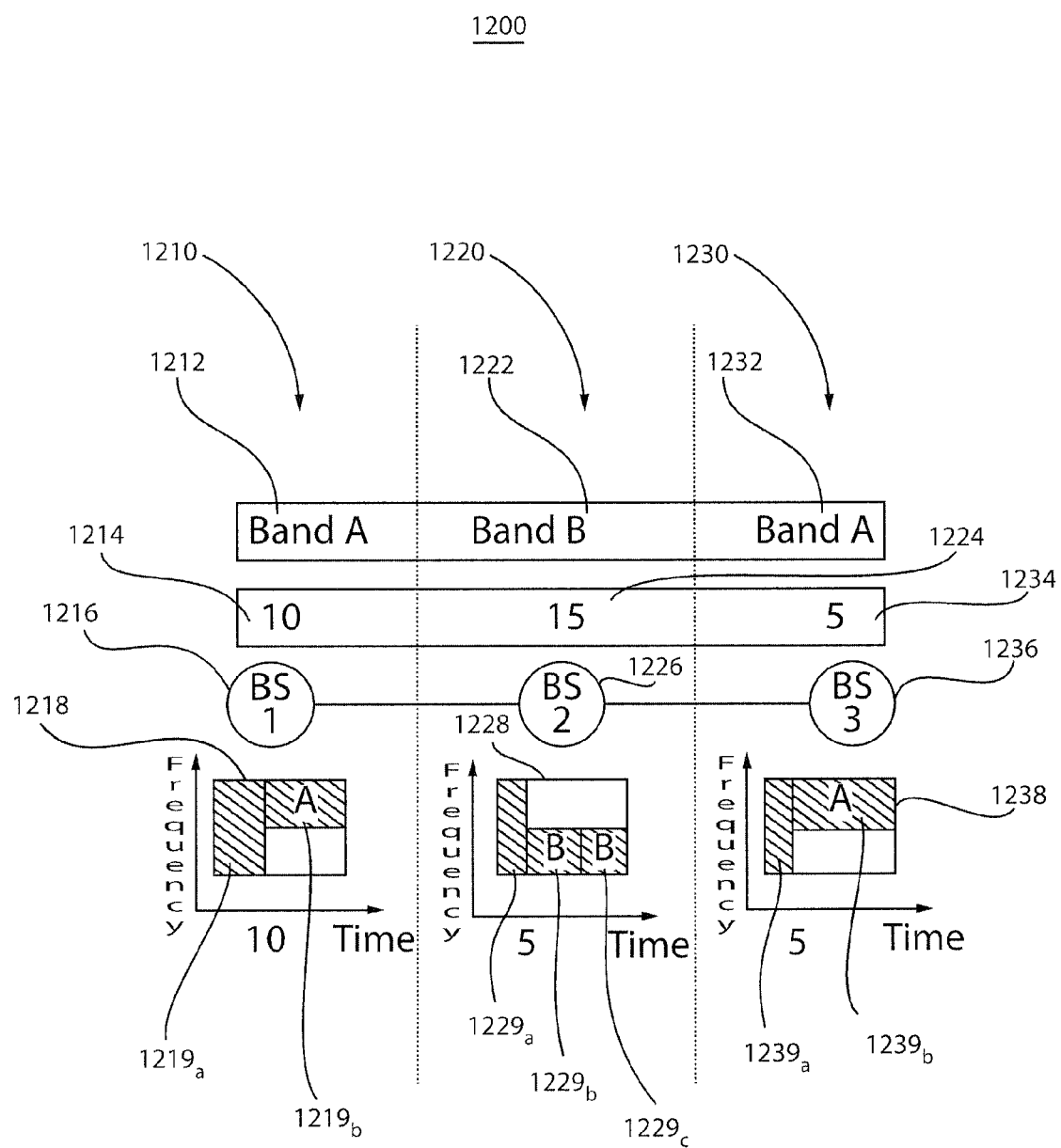
FIG. 12 is a diagram illustrating a zoning mechanism in accordance with an exemplary embodiment.

Reference is now made to FIG. 12 to illustrate how embodiments address the above-described challenges. The diagram 1200 of FIG. 12 elements 1210, 1220 and 1230 respectively depict the features of the zoning mechanism employed by exemplary embodiments for femtocell base stations 1216, 1226 and 1236, respectively. For base station 1216, element 1212 denotes the frequency allocation (band A) to the base station 1216, element 1214 denotes the reuse zone size (10 symbols) desired by the base station 1216 and element 1218 depicts a frame configuration utilized by base station 1216. In addition, element 1222 denotes the frequency allocation (band B) to the base station 1226, element 1224 denotes the reuse zone size (15 symbols) desired by the base station 1226 and element 1228 depicts a frame configuration utilized by base station 1226. Further, element 1232 denotes the frequency allocation (band A) to the base station 1236, element 1234 denotes the reuse zone size (5 symbols) desired by the base station 1236 and element 1238 depicts a frame configuration utilized by base station 1236.

For each cell 1216, 1226 and 1236, the CC 120 determines the minimum of the advertised (desired) $s_r$'s of all the cell's neighbors and uses that as its operational $s_r$ (e.g. 10 symbols for BS1 1216, 5 symbols for BS2 1226). The cell schedules its class 1 clients in the reuse zone until the operational $s_r$ (using all sub-channels) is filled. It continues to schedule class 1 clients in the second zone between its operational $s_r$ and its desired $s_r$. However, these are scheduled only in the band allocated to the cell by $A^3$, i.e. the scheduling of BS2 1226 between the 5th and the 15th symbols. The class 2 clients are scheduled in the resource isolation zone (after the desired $s_r$) using the sub-channels (band) allocated by $A^3$.

Introducing a transition zone that schedules class 1 clients between the operational and desired $s_r$s (using the band given by $A^3$) provides a graceful transition between the reuse and resource isolation zones. For example, the base station 1216 is assigned a reuse size of 10 symbols (the minimum desired reuse zone between preferred reuse zone sizes of it and its neighbors) for its reuse zone 1219a of its frame 1218 and is assigned the remaining resource size for its isolation zone 1219b. However, the base station 1226 is assigned a reuse zone size of 5 symbols (the minimum desired reuse zone between preferred reuse zone sizes of it and its neighbors) for its reuse zone 1229a of its frame 1218. Thus, for the remaining class 1 clients served by the base station 1226, the base station 1226 is assigned a transition zone 1229b to serve these class 1 clients. The transition zone 1229a is in an isolation zone portion of the frame and corresponding isolated sub-channels are used to serve these class 1 clients. The remainder portion 1229c of the isolation zone is used by the base station 1226 to serve it class 2 clients. For the base station 1236, the base station 1236 is assigned a reuse zone 1239a size that is equal to its desired reuse zone size for its class 1 clients and is assigned a corresponding isolation zone 1239b on which the base station 1236 transmits data signals to its class 2 clients.

As indicated above, since the chance for underutilization is higher when the operational $s_r$ exceeds the desired $s_r$, the system uses the minimum of the desired $s_r$s in a neighborhood of a cell as the operational $s_r$ for a cell. Further, since each cell computes its operational $s_r$ only based on the desired $s_r$s of its neighbors and not their operational $s_r$s, propagation of a single common $s_r$ in the network (and the resulting under-utilization) is avoided. As an example, this would correspond to every BS having the same $s_r$ (i.e. global min.) of 5 symbols in FIG. 12. Using the minimum of the desired $s_r$s of neighbors (i.e. local min.) avoids this propagation for BS1 1216 and permits it to have an $s_r$ of 10 symbols. Hence, different regions of the network can have different $s_r$ values, which increases the potential for sub-channel reuse. Further, cells that belong to multiple contention regions with different operational $s_r$s in the different cliques (e.g. BS2 1226 in FIG. 10) will not suffer from interference to their class 2 clients, since the operational $s_r$ of all their cliques will be less than their desired $s_r$, while they schedule only class 1 clients in the region between their operational and desired $s_r$. It can be shown that the zoning arrangement described herein provides significant gains since the $s_r$ values in different cliques can be decoupled (i.e. a single globally minimum desired $s_r$ does not propagate).

Figure 13:
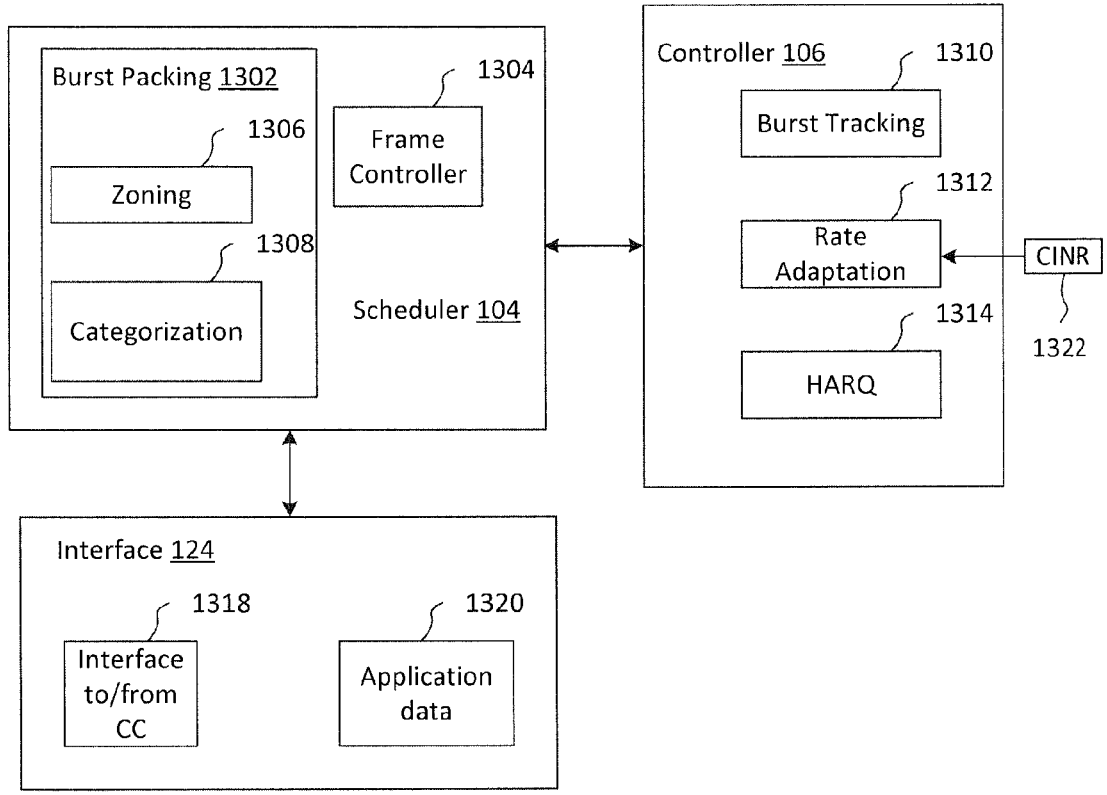
FIG. 13 is a block diagram of a scheduler and a controller of a femtocell base station system in accordance with an exemplary embodiment.

Turning now to more specific elements of the controller 106 and the scheduler 104 of the femtocell base station 101 of FIG. 1, reference is made to FIG. 13, in which embodiments of the scheduler 104 and the controller 106 are illustrated. As depicted in FIG. 13, the scheduler 104 can include a burst packing block 1302, which in turn can include a zoning module 1306 for configuring zones of a frame and a categorization module 1308 for categorizing the mobile stations served by the base station 101 as described above. In addition, the scheduler 104 can further include a frame controller configured to implement the transmission of frames via transmitter 109. The controller 106 of the base station 101 can include a burst tracking module 1310, a rate adaptation module 1312, which receives and processes CINR (carrier to interference plus noise ratio) feedback 1322 from the mobile stations 102 and a HARQ module 1314 for implementing hybrid automatic repeat request functions. Further, the interface 124 can provide an interface 1318 to the central controller 120, as described above, and can provide application data 1320 to the scheduler 104 for transmission to the mobile stations 102 served by the base station 101. Each of the above-described components of the scheduler 104 and the controller 106 can be implemented over a MAC/PHY API.

In accordance with exemplary aspects, when data from higher layers is passed onto the MAC, the data is routed based on the MS to which it is intended and based on whether that MS is already categorized or not, as described above. If the MS is already categorized, its data is packed in the relevant zone of the frame that the MS needs (reuse vs. resource isolation). If not, its data is packed in the measurement (recall free and occupied) zones introduced for categorization. The burst packing component 1302 implements a rectangular alignment of the data of both MSs that have been categorized before as well as MSs that are being categorized. After packing, the data is passed onto the frame controller 1304, which prepares the control payload before the frame is transmitted on the air. The burst tracking component 1310 keeps an information tuple for the measurement zones for the MSs that are being categorized. It tracks the ACK status of each measurement burst. After enough BDR samples are collected, it decides on the client category and informs the burst packing component 1302 about the decision. The interface 1318 with the CC 120 leverages kernel sockets to communicate the load and conflict information to the CC 120 via Ethernet and receives operational parameters for zoning and allocation (used by the burst packing component).

Figure 14:
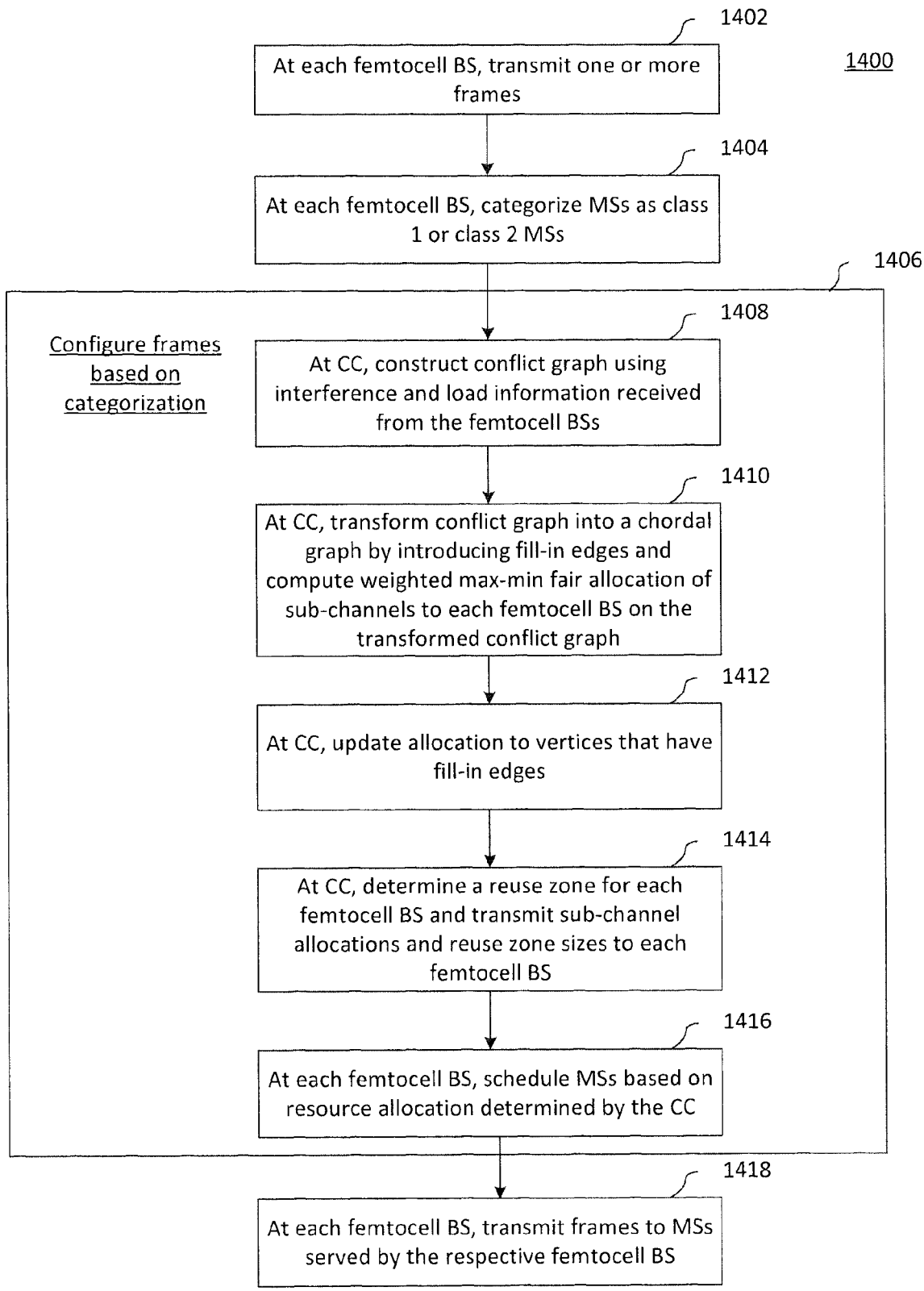
FIG. 14 is a block/flow diagram of a method for managing resources in femtocells in accordance with an exemplary embodiment.

With reference now to FIG. 14, a method 1400 for managing resources in femtocells in accordance with an exemplary embodiment is illustratively depicted. It should be understood that all aspects of the present principles described above can be incorporated into the method 1400. The method 1400 can begin at step 1402, at which each femtocell base station in a set of femtocell base stations can transmit at least one frame according to aspects of the present principles. For example, as described above with respect to FIG. 9, a frame 900 that can be transmitted at step 1402 can include: a free zone 904 that is used to measure client throughput without interference; an occupied zone 906 that is used to measure client throughput with interference from other femtocells; a reuse zone 908 that is used to schedule Class 1 clients using all sub-channels in the zone 908; and a resource isolation zone 910 that is used to schedule Class 2 clients using an isolated set of sub-channels, such as sub-channels in sub-zone 911 of zone 910. Here, as indicated above, among base stations that are adjacent to or neighboring a given base station, the isolated set of sub-channels is only assigned to the give base station. As also stated above, the femtocell base stations can be configured to implement transmission of signals in the occupied zone 906 to measure throughput with interference from femtocell base stations that are neighboring or are adjacent to a given femtocell base station. Moreover, all base stations in the set are permitted to employ the reuse zone 908 to serve their corresponding mobile stations, as described above.

Continuing with step 1402, in accordance with directions from the controller 106, each femtocell BS transmits bursts to each of its mobile stations using the free and occupied zones in the frame. While the occupied zone bursts are sent in every frame, the free zone bursts are sent based on a uniformly random decision. Each femtocell decides to transmit a free zone burst with a probability $$\frac{\gamma}{n}$$

where n is the number of femtocell BSs interfering with each other and $\gamma \geq 1$ is a constant parameter set by the CC 120. The two bursts are transmitted for K consecutive frames. It should be noted that, in a preferred embodiment, the free zone 904 and the occupied zone 906 are employed on a limited or periodic basis. For example, the base stations 101 can be configured to use the measurement zones 904 and 906 only on a periodic basis and/or at the direction of the CC 120. During frame periods in which these measurement zones 904 and 906 are not used, the respective resources in zones 904 and 906 are incorporated into the reuse zone 908.

Figure 15:
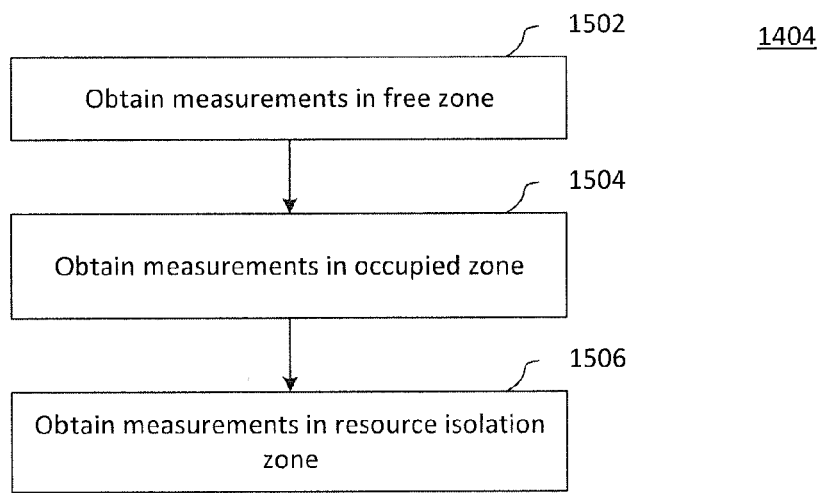
FIG. 15 is a block/flow diagram of aspects of a method for categorizing mobile stations in accordance with an exemplary embodiment.

At step 1404, each controller 106 of each femtocell base station categorizes mobile stations it serves in interference classes. For example, as stated above, a Burst Delivery Ratio (BDR) is the ratio of total number of successfully received bursts (by the clients) to the total number of bursts transmitted by the femtocell (which can be estimated by summing ACKs and NACKs received, as stated above). FIG. 15 illustrates aspects of the categorization step 1404. After K frames, each controller 106 of each femtocell BS 101 computes the occupied zone throughput $T_{occ}$ and similarly the free zone throughput $T_{free}$ based on the BDR values for each respective zone, as described above. These values can be obtained by obtaining measurements in the free zone and in the occupied zone at steps 1502 and 1504, respectively. If $T_{free} < (1+\alpha)^* T_{occ}$, then the corresponding mobile station 102 is categorized as Class or Category 1, as described above. Otherwise, the mobile station 102 is determined to be Class or Category 2. Here, $\alpha$ is used as a parameter to achieve a high accuracy in categorizing clients that experience fading (no interference). $\alpha$ can be determined from calibration measurements. The controller 106 of each femtocell base station 101 can also obtain measurements in the resource isolation zone at step 1506. These measurements can, for example, aid in determining an interference map, as described above.

Continuing with step 1404, after the above-described initial categorization, the cc 120 assigns each femtocell base station a resource isolation zone and a reuse zone. The size of the reuse zone, in terms of number of tiles, can be different from the size of the occupied zone. We define X to be the ratio of the number of tiles in the reuse zone to the number of tiles in the occupied zone. Each femtocell computes the throughput in the resource isolation zone $T_{isol}$ and performs the categorization again for those clients that were categorized to be class or category 2 previously. $T_{isol}$ can be computed based on measurements obtained in the resource isolation zone at step 1506. As before, the controller 106 of the femtocell also computes the throughput $T_{occ}$ of the occupied zone. If $$T_{isol} < (1 + \beta) * T_{occ} * \frac{t_{reuse}}{t_{occ}},$$

the controller 106 categorizes the client as Class 1; otherwise it is Class 2. Here $\beta$ is used to have some flexibility in decisions and can be set to a very small value, such as 0.05. $T_{occ}$ is used as a reference measurement of the throughput with interference and is scaled by X to compute the throughput that the client will achieve in the reuse zone.

Continuing with step 1404, after the clients are categorized, each controller 106 of each femtocell base station 101 determines the load for both the reuse zone and the resource isolation zone, as described above. Based on the ratio of the loads for the reuse zone and the resource isolation zone, each controller 106 of each femtocell base station 101 computes a desired reuse zone size in units of OFDMA symbols. Each controller 106 of each femtocell base station 101 also determines the set of femtocells that project interference on its Class 2 clients. The controller 106 transmits the interference information identifying the interfering femtocells, the Class 2 load and the desired reuse zone size is provided to the CC 120 through the network 122.

At step 1406, which can be implemented by steps 1408-1416, the CC 120 and the base stations 101 can configure the resources of one or more frames based on the categorization. For example, at step 1408, the CC 120 can construct an interference map or a conflict graph, as described above, using the load and interference information received from each femtocell base station in accordance with step 1404. As stated above, the conflict graph represents each femtocell as a vertex and an edge between two vertices indicates that at least one of the femtocells projects interference to the Class 2 clients of the other. Further, the conflict graph or interference map can be determined based on power measurements made by mobile stations, as discussed above. Moreover, for each of the mobile stations, the controller 106 of each femtocell base station can identify the adjacent base stations that provide a signal power that exceeds a threshold. This information can be included in the load and interference information transmitted by each femtocell base station in accordance with step 1404. In accordance with one exemplary aspect, as stated above, the interference map or conflict graph can be iteratively determined using BDR information obtained by each controller 106 of each femtocell base station 101.

At step 1410, the CC 120 transforms the conflict graph into a chordal graph by introducing fill-in edges by using Maximum Cardinality Search, as discussed above. In particular, with reference to FIG. 16, step 1410 can be implemented by the CC 120, as described above, by listing all maximal cliques in the conflict graph at step 1602, and, at step 1604, computing the weighted share of each femtocell BS for each maximal clique to which it belongs and determining the corresponding allocation. For example, the CC 120 can determine the weighted max-min sub-channel allocation to each vertex as:

$$A_i = \min_{j : v_i \in C_j} \left\lfloor \frac{l_i R_j}{\sum_{k : v_k \in C_j} l_k} + 0.5 \right\rfloor, \forall v_i \in \mathcal{U}$$

A is computed as the minimum rounded weighted share of each vertex in all of its contention regions, as discussed above. As stated above, contention regions are formed as maximal cliques on the chordal graph. In response to determining the allocation for each femtocell base station, the CC 120, at step 1606, can construct a clique tree of the chordal graph and can assign sub-channels in accordance with the allocation of step 1604. For example, an arbitrary node can be chosen as the root and the CC 120 starts assigning sub-channels to vertices proceeding from the root to the leaves of the clique tree. The assignment is made based on the allocation subject to the following: If two vertices have edges between them, the CC 120 assigns such vertexes orthogonal sets of sub-channels in the resource isolation zone.

At step 1412, the CC 120 can update the allocation to the vertices that have a fill-in edge between them, as described above. For example, the CC 120 can conduct a restoration operation whereby the CC 120 can remove edges between base stations in the chordal graph. For each such vertex VE, the sub-channels that are not assigned to any other neighboring vertex are assigned to VE.

At step 1414, the CC 120 can determine the operational reuse zone size for each femtocell base station as the minimum desired or selected reuse zone size of it and its neighbors, as described above. Here, the CC 120 disseminates the reuse zone size information and the sub-channel allocation to the femtocell base stations.

Figure 11:
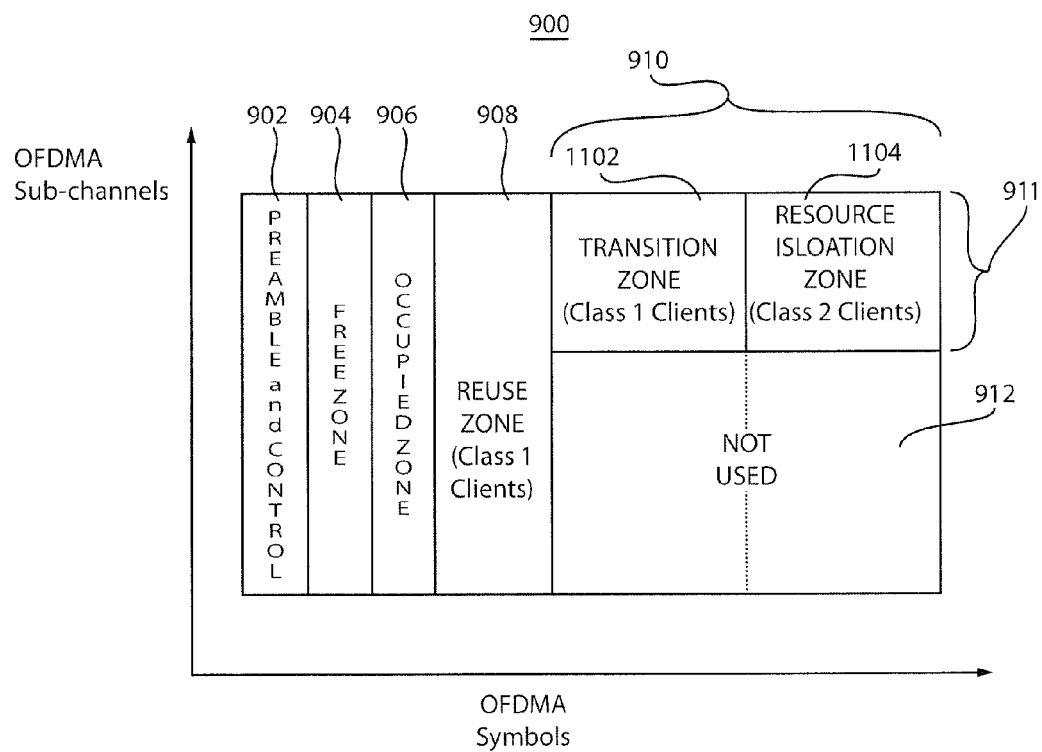
FIG. 11 is a block diagram of a resource frame in which a transition zone is employed in accordance with an exemplary embodiment.
Figure 16:
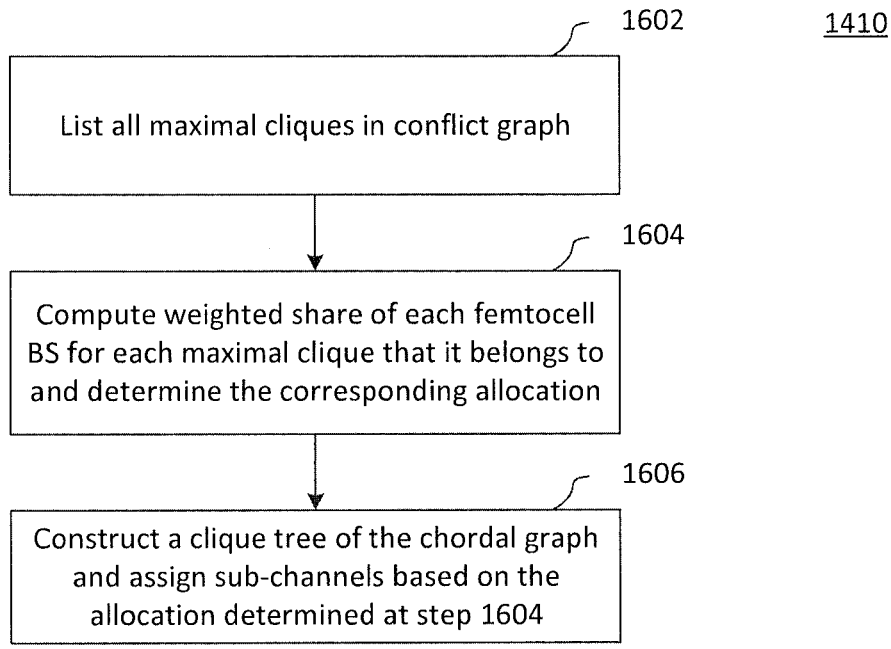
FIG. 16 is a block/flow diagram of aspects of a method for allocating resources to femtocell base stations in accordance with an exemplary embodiment.
Figure 17:
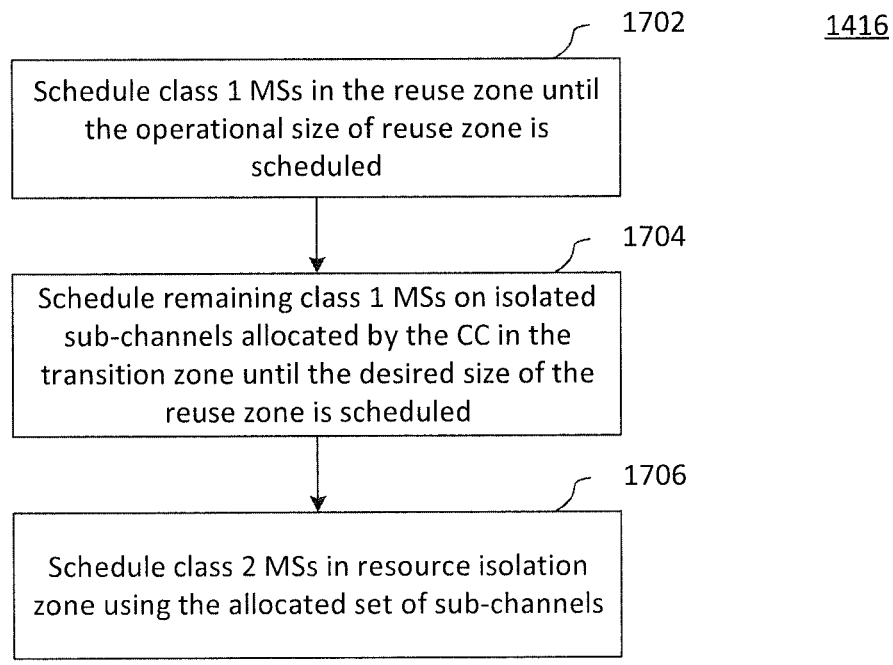
FIG. 17 is a block/flow diagram of a method for scheduling resources at femtocell base stations in accordance with an exemplary embodiment.

At step 1416, which can be implemented by performing steps 1602-1606 of FIG. 16, in response to receiving the resource allocation parameters transmitted by the CC 120 at step 1414, the scheduler 104 of each femtocell base station schedules the mobile stations 102 that it services as follows. Since the operational reuse zone size is determined as the minimum desired size of a femtocell's neighbors, it is going to be less than or equal to the desired reuse zone size of the femtocell. At step 1702, the scheduler 104 of each femtocell base station 101 schedules its Class 1 clients starting from the beginning of the frame until the operational reuse zone size. For example, with reference to FIG. 11, the scheduler 104 schedules class 1 clients in the reuse zone 908. At step 1704, if the reuse zone size desired or selected by the controller 106 of the corresponding base station 101 is larger than the operational size, the scheduler 104 continues to schedule its Class 1 clients starting from the operational size until the desired size. For example, this portion of the frame is the transition subzone 1102 of the resource isolation zone 910. As such, the transition zone scheduling is executed on the isolated set of sub-channels allocated by the CC 120. After the desired reuse zone size is scheduled, at step 1706, the scheduler 104 schedules its Class 2 clients using the isolated set of sub-channels allocated by the CC 120 in subzone 1104.

Having described preferred embodiments of a systems and methods for femtocell resource management for interference mitigation (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for managing resources in at least one femtocell, the method comprising:
    transmitting at least one frame including a first zone of resources on which a set of base stations including at least one femtocell base station and base stations that are adjacent to said at least one femtocell base station implement transmission of signals to impose interference and including a second zone dedicated for measuring throughput of mobile stations served by the at least one femtocell base station without interference;
    categorizing the mobile stations served by the at least one femtocell base station in interference classes by determining throughputs of said mobile stations served by the at least one femtocell base station with interference based on the transmission of signals on the first zone;
    configuring resources of at least one additional frame based on the categorizing; and
    transmitting the at least one additional frame in a cell of said at least one femtocell base station in accordance with said configuring,
    wherein the at least one frame further comprises a third zone dedicated for data transmissions by any base station in the set and a fourth zone including a subset of resources that are dedicated for only the at least one femtocell base station among the base stations of said set,
    wherein the interference classes include a first class of mobile stations for which said third zone is utilized and a second class of mobile stations for which said fourth zone is utilized,
    wherein the categorizing further comprises categorizing a first mobile station of the mobile stations as the first class of mobile stations if $T_{free} < (1+\alpha)*T_{occ}$, where $T_{free}$ is a determined throughput of the first mobile station in the second zone, $T_{occ}$ is a determined throughput of the first mobile station in the first zone and $\alpha$ is a pre-determined threshold, and
    wherein a zone comprises a portion of the at least one frame in which one or more bursts can be scheduled, and the first, second, third, and fourth zones comprise occupied, free, reuse, insolation zones, respectively.

2. The method of claim 1, wherein the categorizing further comprises categorizing the first mobile station as the second class of mobile stations if $$T_{isol} \geq (1+\beta)*T_{occ}*\frac{t_{reuse}}{t_{occ}},$$

wherein $T_{isol}$ is a determined throughput of the first mobile station in the fourth zone, $\beta$ is a second pre-determined threshold, $t_{reuse}$ is a total number of tiles in the third zone of the at least one frame and $t_{occ}$ is a total number of tiles in the first zone of the at least one frame.

3. The method of claim 2, wherein the categorizing further comprises categorizing the first mobile station as the first class of mobile stations if $$T_{isol} < (1+\beta)*T_{occ}*\frac{t_{reuse}}{t_{occ}}.$$

4. The method of claim 1, wherein the configuring further comprises generating an interference map for the set of base stations that is based on power measurements made by said mobile stations and wherein the configuring further comprises, for each of said mobile stations, identifying the adjacent base stations that provide a signal power that exceeds a threshold.

5. The method of claim 4, wherein the configuring further comprises, for each of the mobile stations, iteratively computing a burst delivery ratio for the fourth zone and a burst delivery ratio for the second zone and iteratively associating one or more of the identified base stations providing the highest signal powers with the at least one femtocell base station in the interference map until the burst delivery ratio of the mobile station for the fourth zone falls within a predetermined fraction of the burst delivery ratio of the mobile station for the second zone with a removal of interference from the associated base stations in the fourth zone.

6. The method of claim 4, wherein the configuring further comprises transforming the interference map into a chordal graph and determining maximal cliques in the chordal graph as contention regions.

7. The method of claim 6, wherein the configuring further comprises computing a weighted share of frame resources of each base station in the set of base stations for each contention region to which the base station belongs.

8. The method of claim 7, wherein the configuring further comprises selecting, for each base station in the set, a minimum of the weighted shares computed for the respective base station as an initial allocation to the respective base station.

9. The method of claim 8, wherein the configuring further comprises assigning sub-channels of the at least one additional frame to each of the base stations in the set according to the initial allocation for the respective base station such that the base stations that share a common contention region are assigned sub-channels in a respective fourth zone of the at least one additional frame that are orthogonal with respect to sub-channels assigned to other base stations in the respective contention region in the respective fourth zone.

10. The method of claim 9, further comprising removing an edge between a first base station in the chordal graph and a second base station and assigning at least one of the sub-channels assigned to the first base station to the second base station.

11. The method of claim 1, wherein the configuring further comprises assigning for a size of the third zone for the at least one additional frame for the at least one femtocell base station as a minimum size chosen between sizes of the third zone for the at least one additional frame selected by the at least one femtocell base station and by the base stations that are adjacent to said at least one femtocell base station.

12. The method of claim 11, wherein the third zone of the at least one frame for the at least one femtocell base station is dedicated for a first class of said mobile stations according to said categorizing and wherein the fourth zone of the at least one frame for the at least one femtocell base station is utilized for a second class of said mobile stations according to said categorizing and is utilized for mobile stations designated as said first class according to said categorizing.

13. A system for managing transmission resources in at least one femtocell, the system comprising:
a set of femtocell base stations configured to transmit frames that include a first zone of resources on which the base stations implement transmission of signals to impose interference and include a second zone dedicated for measuring throughput of mobile stations served by at least one of the femtocell base stations without interference, wherein the at least one of the femtocell base stations is further configured to perform categorization of the mobile stations in interference classes by determining throughputs of said mobile stations with interference based on the transmission of signals on the first zone; and a central controller configured to determine a configuration of resources of at least one additional frame based on the categorization by the at least one of the femtocell base stations, wherein the at least one of the femtocell base stations is further configured to transmit the at least one additional frame in accordance with said configuration, wherein the frames further comprise a third zone dedicated for data transmissions by any base station in the set and a fourth zone including a subset of resources that are dedicated for only the at least one femtocell base station among the base stations of said set, wherein the interference classes include a first class of mobile stations for which said third zone is utilized and a second class of mobile stations for which said fourth zone is utilized, wherein the categorization further comprises categorizing a first mobile station of the mobile stations as the first class of mobile stations if $T_{free} < (1+\alpha)*T_{occ}$, where $T_{free}$ is a determined throughput of the first mobile station in the second zone, $T_{occ}$ is a determined throughput of the first mobile station in the first zone and $\alpha$ is a predetermined threshold, and wherein a zone comprises a portion of the at least one frame in which one or more bursts can be scheduled, and the first, second, third, and fourth zones comprise occupied, free, reuse, insolation zones, respectively.

14. The system of claim 13, wherein the at least one additional frame further comprises said first zone, said second zone, a third zone dedicated for transmissions by any base station in the set and a fourth zone including a subset of resources that are dedicated for only the at least one femtocell base station among the base stations of said set.

15. The system of claim 14, wherein the interference classes include a first class of mobile stations for which said third zone is utilized and a second class of mobile stations for which said fourth zone is utilized.

* * * * *